(12) United States Patent
Eom

(10) Patent No.: US 10,942,419 B2
(45) Date of Patent: Mar. 9, 2021

(54) CAMERA MODULE

(71) Applicant: SAMSUNG ELECTRO-MECHANICS CO., LTD., Suwon-si (KR)

(72) Inventor: Jae Ki Eom, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/410,106

(22) Filed: May 13, 2019

(65) Prior Publication Data

US 2020/0073200 A1    Mar. 5, 2020

(30) Foreign Application Priority Data

Aug. 28, 2018   (KR) .................. 10-2018-0101245

(51) Int. Cl.
*H04N 5/232* (2006.01)
*H04N 5/225* (2006.01)
*G02B 27/64* (2006.01)
*G03B 3/10* (2006.01)
(Continued)

(52) U.S. Cl.
CPC ............... *G03B 3/10* (2013.01); *G02B 7/08* (2013.01); *G02B 27/646* (2013.01)

(58) Field of Classification Search
CPC ...... H04N 5/222; H04N 5/225; H04N 5/2257; H04N 5/2252; H04N 5/2253; H04N 5/2254; H04N 5/2328; H04N 5/23248; H04N 5/23287; G03B 3/10; G03B 5/00; G03B 2205/0007; G03B 13/36; G02B 27/646; G02B 7/08; G02B 7/023; H05K 1/181

USPC ....... 348/208.99, 208.1, 208.2, 208.4, 208.5, 348/208.11, 222.1, 208.12, 326, 345, 349,
(Continued)

(56) References Cited

U.S. PATENT DOCUMENTS 8,820,335 B2 *   9/2014   Topliss ................... H04N 5/228
                                                                  348/208.11
8,830,335 B2     9/2014   Topliss et al.
(Continued)

FOREIGN PATENT DOCUMENTS

JP          2018-018083 A      2/2018
KR    10-2009-0081855 A        7/2009
(Continued)

OTHER PUBLICATIONS

Korean Office Action dated Nov. 19, 2019 in corresponing Korean Patent Application No. 10-2018-0101245 (5 pages in English, 5 pages in Korean).

*Primary Examiner* — Marly S Camargo
(74) *Attorney, Agent, or Firm* — NSIP Law

(57) ABSTRACT

A camera module includes a housing having an internal space, a first moving body movably disposed in the internal space, a second moving body movably disposed in an internal space of the first moving body, a driving member including optical image stabilization (OIS) driving wires formed of a shape memory alloy, a first board to which at least one end of each OIS driving wire is connected, and a second board, disposed internally of the first board, to which each OIS driving wire is connected, and an autofocusing (AF) driving member including AF driving wires formed of a shape memory alloy, a frame bar, and a mounting bar disposed in a central portion of the frame portion.

22 Claims, 43 Drawing Sheets

(51) Int. Cl.
*G03B 13/36* (2006.01)
*G02B 7/08* (2021.01)

(58) Field of Classification Search
USPC ............. 348/373, 374, 375, 376, 281, 211.2,
348/207.99; 396/535, 79, 80, 121
See application file for complete search history.

(56) References Cited

U.S. PATENT DOCUMENTS

| | | | |
|---|---|---|---|
| 9,134,503 B2 * | 9/2015 | Topliss | G02B 7/08 |
| | | | 348/208.11 |
| 9,137,429 B2 | 9/2015 | Topliss et al. | |
| 9,479,699 B2 * | 10/2016 | Brown | H04N 5/23248 |
| | | | 348/208.1 |
| 9,609,219 B2 * | 3/2017 | Jowarth | H04N 5/23258 |
| | | | 348/374 |
| 10,444,598 B1 * | 10/2019 | Heo | G03B 5/00 |
| | | | 348/208.7 |
| 2018/0031854 A1 | 2/2018 | Hu et al. | |
| 2018/0052381 A1 | 2/2018 | Koepfer | |
| 2019/0227406 A1 * | 7/2019 | Wang | 396/510 |
| 2020/0209710 A1 * | 7/2020 | Park | G03B 3/10 |
| | | | 396/133 |
| 2020/0333623 A1 * | 10/2020 | Oh | H04N 5/2252 |
| | | | 359/554 |

FOREIGN PATENT DOCUMENTS

KR         10-1588944 B1    1/2016
KR    10-2018-0003532 A     1/2018

* cited by examiner

CAMERA MODULE

CROSS-REFERENCE TO RELATED APPLICATION

This application claims the benefit under 35 USC 119(a) of Korean Patent Application No. 10-2018-0101245 filed on Aug. 28, 2018, in the Korean Intellectual Property Office, the entire disclosure of which is incorporated herein by reference for all purposes.

BACKGROUND

1. Field

The following description relates to a camera module.

2. Description of Background

Cameras have Generally been Employed in Mobile Electronic Devices Such as smartphones, tablet PCs, laptop computers, and the like.

However, in order to implement various functions, structures of camera modules have become complex and sizes of the camera modules have increased. As a result, a mobile electronic component, in which a camera module is mounted, has also increased in size.

With the growth in the smartphone camera market, attempts have been made to integrate functions of existing passive cameras such as an autofocusing (AF) function, an optical zoom function, and the like, in addition to an optical image stabilization (OIS) driving method. Accordingly, there is demand for an OIS driving method and an AF driving method depending on structural diversification, other than an existing OIS method and an existing AF method.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes a housing having an internal space, a first moving body movably disposed in the internal space, a second moving body movably disposed in an internal space of the first moving body, a driving member including optical image stabilization (OIS) driving wires formed of a shape memory alloy, a first board to which at least one end of each OIS driving wire is connected, and a second board, disposed internally of the first board, to which each OIS driving wire is connected, and an autofocusing (AF) driving member including AF driving wires formed of a shape memory alloy, a frame bar, and a mounting bar disposed in a central portion of the frame portion.

The first board, the second board, the frame portion, and the mounting bar may each include a bonding pad to bond the OIS driving wire to the AF driving wire, and ends of each OIS driving wire and each AF driving wire may be bonded to one of the bonding pads by spark discharge and ultrasonic vibrations.

The camera module may include a reinforcing member disposed to cover the ends of each OIS driving wire, the ends of each AF driving wire, and each bonding pad.

The reinforcing member may include a synthetic resin material cured by heat or ultraviolet rays.

After the first board and the second board are integrally manufactured, the first board and the second board may be separated to be attached to either one of a pair of the housing and the first moving body and a pair of the first moving body and the second moving body.

The OIS driving wires may include a pair of OIS driving wires disposed on respective side surfaces of the first moving body, and each OIS driving wire may be bonded to the first moving body or the second moving body such that one end of each OIS driving wire is bonded to an internal edge side of the housing or the first moving body, and the other end of each OIS driving wire may be disposed adjacent to a central axis of the first moving body or the second moving body.

The first board may include a first mounting hole disposed on an edge side of the first board, and the second board may include a second mounting hole disposed in the second board adjacent to a central axis of the second board.

Each OIS driving wire may be mounted on the first board and the second board to pass through the first mounting hole and the second mounting hole, and may have both ends fixed to the first board by a knot.

The frame portion may be mounted in one of the housing and the first moving body and the mounting bar may be mounted in the other one of the housing and the first moving body, or the frame portion may be mounted in one of the first moving body and the second moving body and the mounting bar may be mounted in the other one of the first moving body and the second moving body.

The AF driving wires may include a first AF driving wire, connected to an upper portion of the frame portion, and a second AF driving wire disposed below the first AF driving wire, and each of the first and second AF driving wires may include two driving wires.

Each of the first and second AF driving wires may include a first end, disposed adjacent to an edge side of the frame portion, and a second end bonded to the mounting bar.

The first board may include a guiding member to which at least one of the OIS driving wires is connected.

The guiding member may be coupled to a mounting hole formed in the second board, the at least one OIS driving wire may have both ends bonded to the first board, and may have a portion supported by the guiding member.

The guiding member may include a head portion configured to prevent separation of the OIS driving wire.

Each OIS driving wire may include a first end, bonded to the first board, and a second end bonded to the second board.

Each OIS driving wire may include a pair of cross-coupled OIS driving wires, and a total of eight OIS driving wires may be disposed on four side surfaces of the second board.

In another general aspect, a camera module includes a housing having an internal space, a first moving body movably disposed in the internal space, a second moving body movably disposed in an internal space of the first moving body, an optical image stabilization (OIS) driving member including driving wires formed of a shape memory alloy, and an autofocusing (AF) driving member including AF driving wires formed of a shape memory alloy. Each OIS driving wire connects one of a pair of the housing and the first moving body and a pair of the first moving body and the second moving body, and the AF driving member connects the other of the pair of the housing and the first moving body and the pair of the first moving body and the second moving body. The OIS driving member and the AF driving member each include a bonding pad to bond the OIS driving wire to the AF driving wire, and each of the OIS driving wire and the AF driving wire includes end portions bonded to one of the boding bonding pads by spark discharge and ultrasonic vibrations.

The camera module may include a reinforcing member disposed to cover the end portions of the OIS driving wire, the end portions of the AF driving wire, and the bonding pads.

The reinforcing member may include a synthetic resin cured by heat or ultraviolet rays.

In another general aspect, a camera module includes a housing, a moving body disposed inside the housing and comprising lenses, and a driving member disposed inside the housing, the driving member including a first board, a second board disposed internally of the first board and attached to a surface of the moving body, and optical image stabilization (OIS) driving wires connected between the first board and the second board to drive the moving body in one or more directions perpendicular to an optical axis direction.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
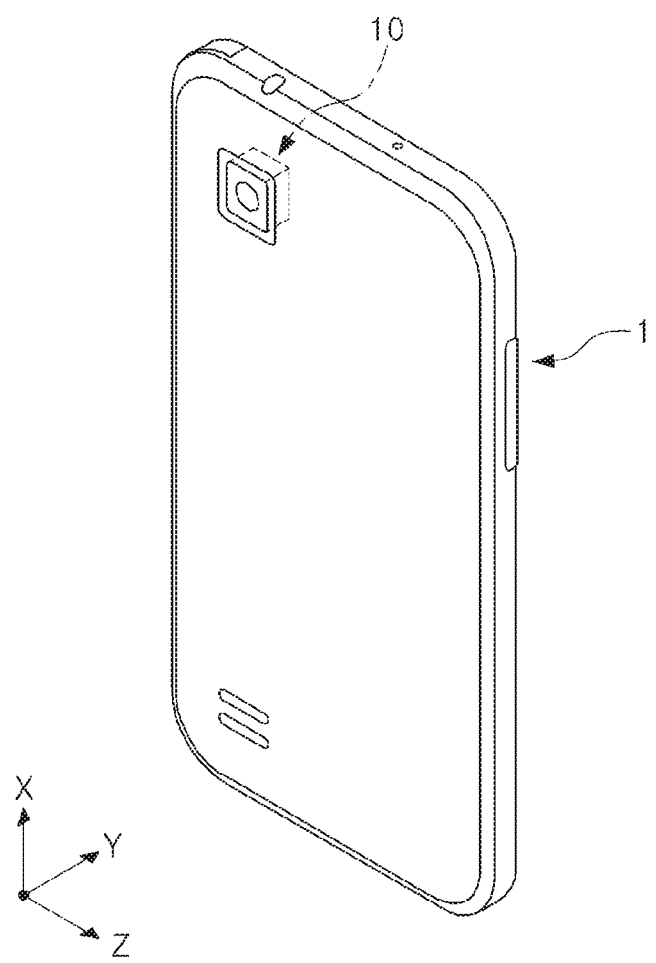
FIG. 1 is a perspective view of a portable electronic device according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, examples will be described with reference to the attached drawings.

FIG. 1 is a perspective view of a mobile electronic device according to an example.

Referring to FIG. 1, a portable electronic device 1 may be a mobile communications terminal, a smartphone, a tablet PC, or the like, in which a camera module 10 is mounted.

As illustrated in FIG. 1, the portable electronic device 1 is provided with the camera module to capture an image of a subject.

The camera module 10 includes a plurality of lenses, and an optical axis (a Z axis) of each of the lenses is directed in a direction perpendicular to a thickness direction (a Y-axis direction or a direction from a front surface of the portable electronic device 1 to a rear surface thereof or an opposite direction to the direction from the front surface of the portable electronic device 1 to the rear surface thereof) of the portable electronic device 1.

The camera module 10 may drive OIS or AF using an OIS driving member 140 (see FIGS. 2 to 4) and an AF driving member 150 (see FIGS. 2 to 4), as described later.

Figure 2:
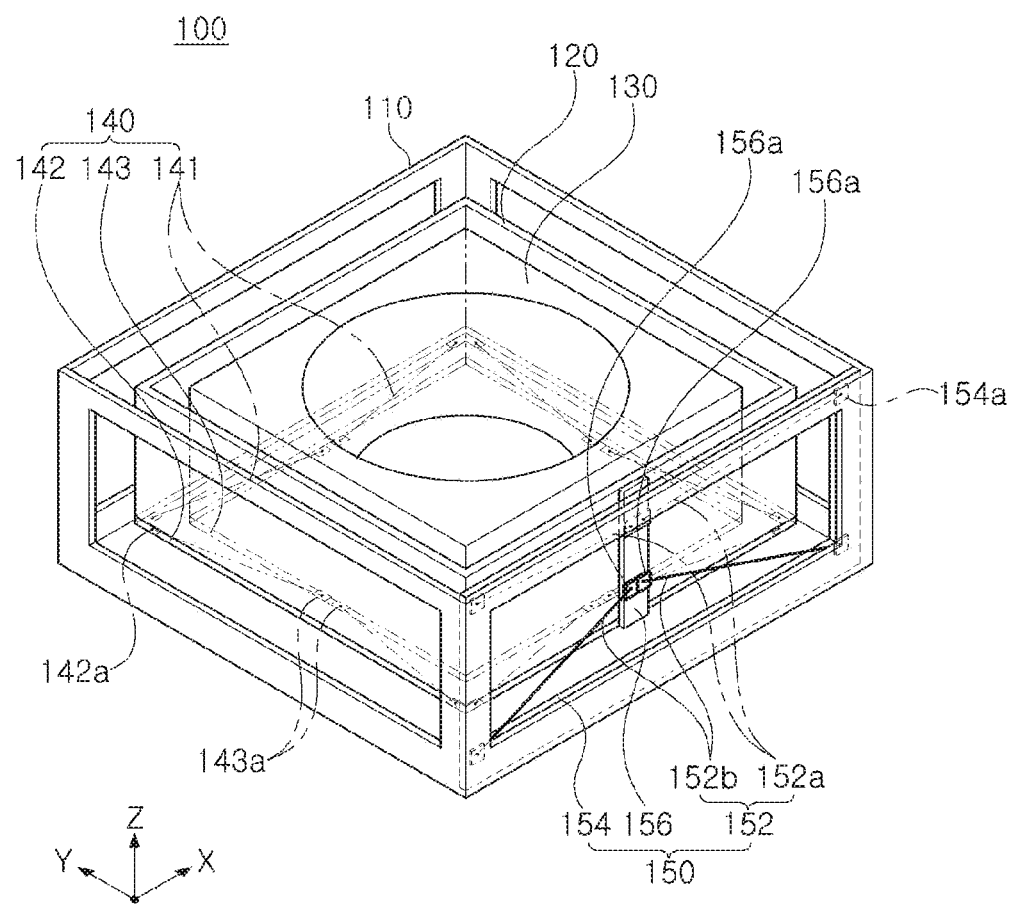
FIG. 2 is a schematic perspective view of a camera module according to a first example.
Figure 3:
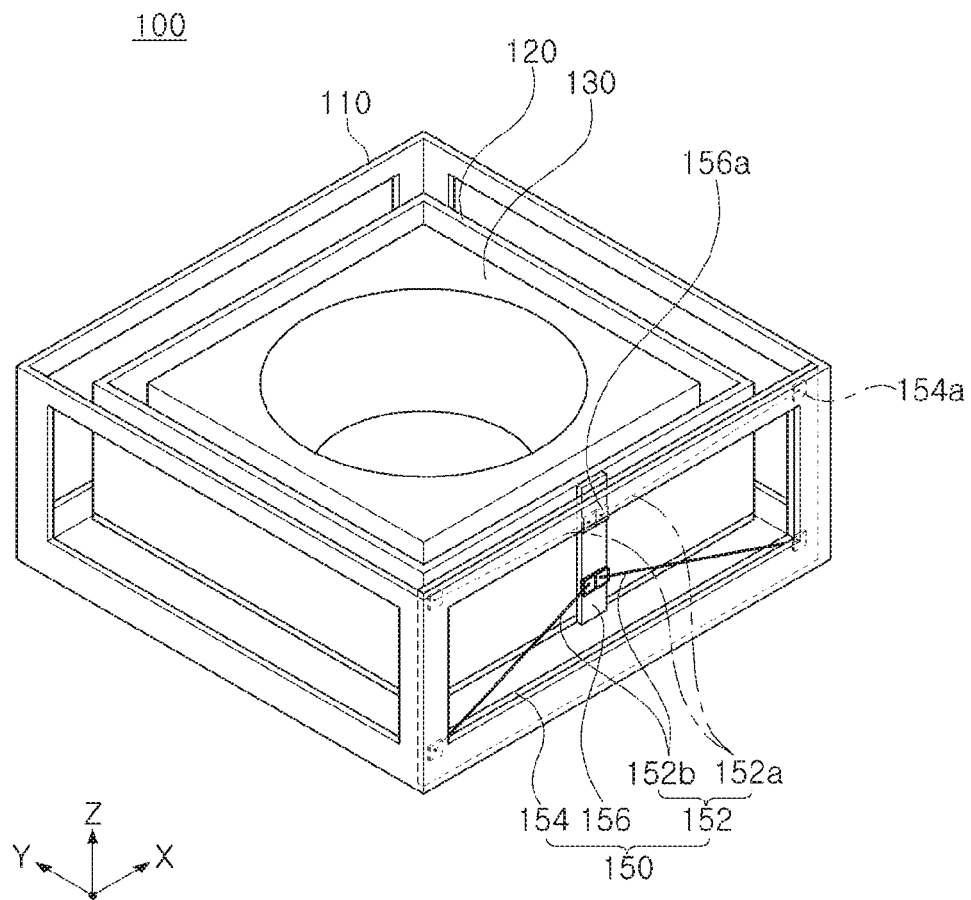
FIG. 3 is an explanatory view illustrating an AF driving member of the camera module according to the first example.
Figure 4:
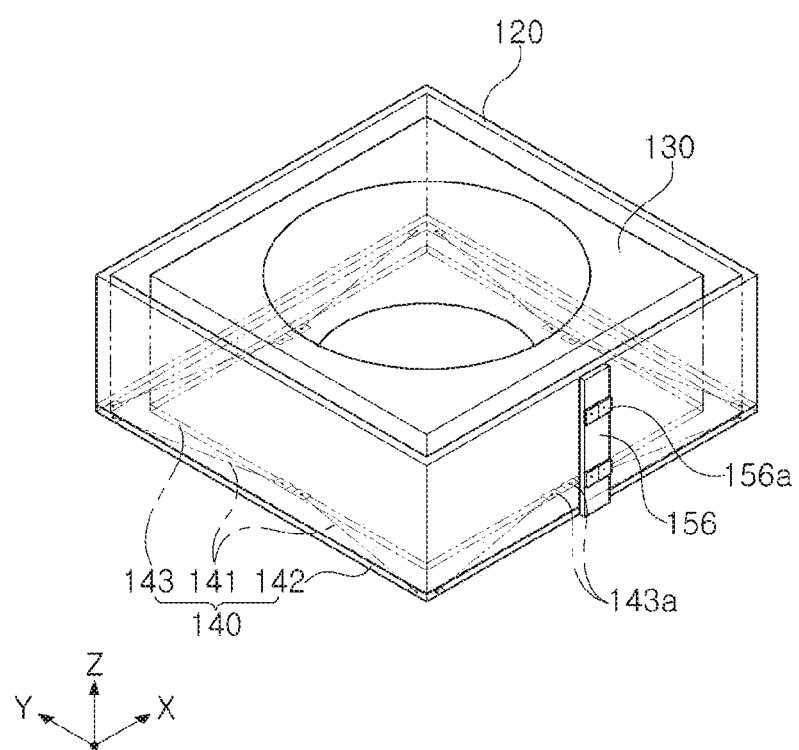
FIG. 4 is an explanatory view illustrating a state of mounting an OIS driving wire of the camera module according to the first example.
Figure 5:
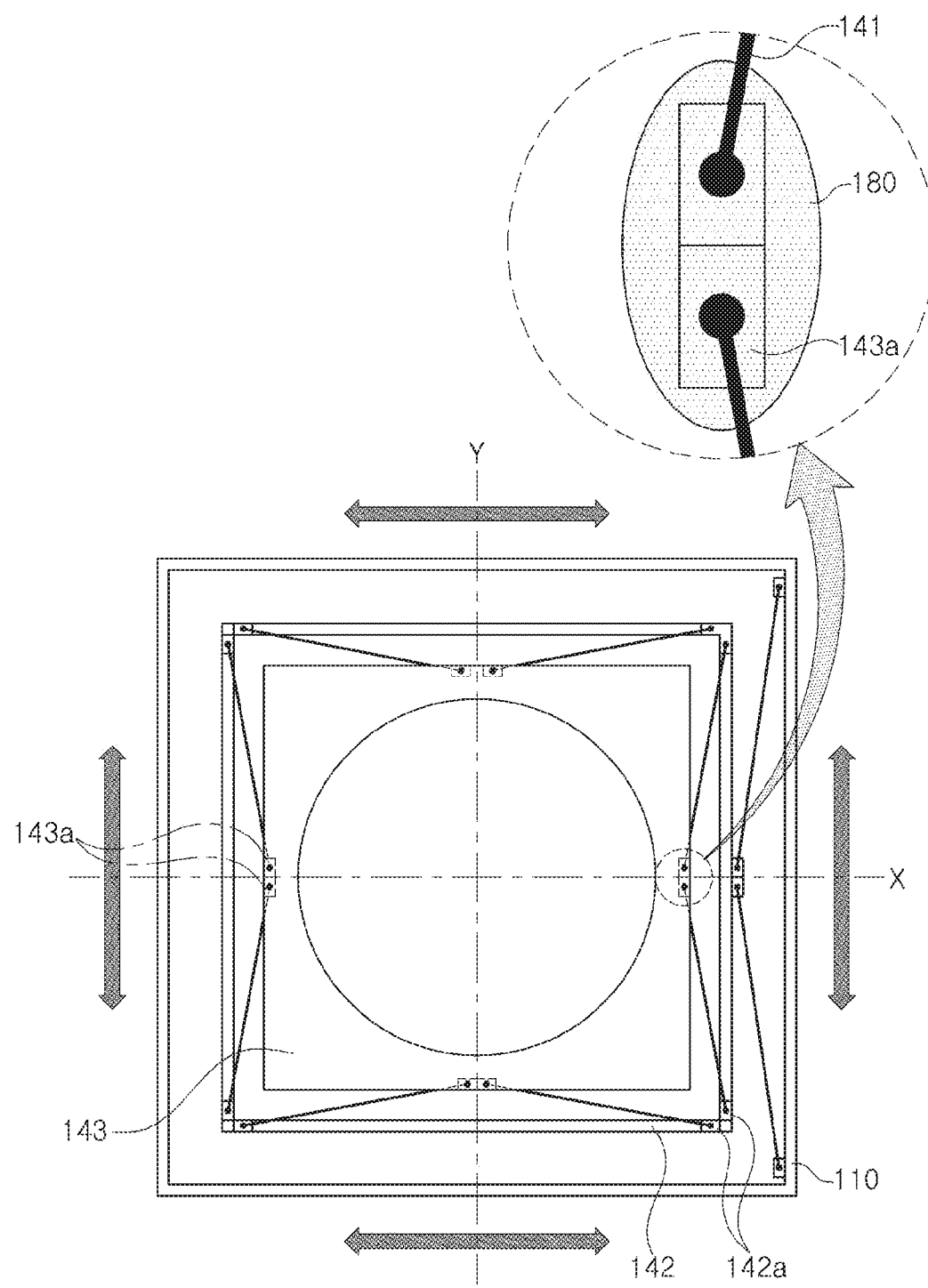
FIG. 5 is a plan view of first and second moving bodies and an OIS driving wire of the camera module according to the first example.
Figure 6:
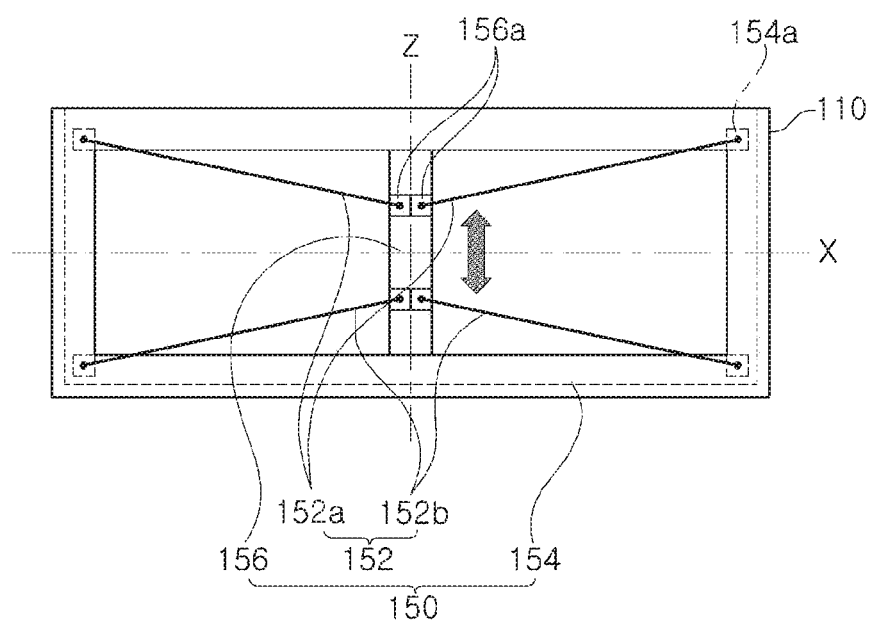
FIG. 6 is a front view illustrating a driving direction of an AF driving member of the camera module according to the first example.

FIG. 2 is a schematic perspective view of a camera module according to a first example, FIG. 3 is an explanatory view illustrating an AF driving member of the camera module according to the first example, FIG. 4 is an explanatory view illustrating a state of mounting an OIS driving wire of the camera module according to the first example, FIG. 5 is a plan view of first and second moving bodies and an OIS driving wire of the camera module according to the first example, and FIG. 6 is a front view illustrating a driving direction of an AF driving member of the camera module according to the first example.

Referring to FIGS. 2 to 6, a camera module 100 may include a housing 110, a first moving body 120, a second moving body 130, an OIS driving member 140, an AF driving member 150, and a reinforcing member 180.

The housing 110 may have an internal space and may have a substantially hexahedral shape. For example, the housing 110 has surfaces on which openings are formed, respectively. The housing 110 may serve as a supporting structure of the first moving body 120.

The first moving body 120 is provided in the housing 110 to be movable in the internal space of the housing 110. As an example, the first moving body 120 is moved in one axial direction (for example, a Z-axis direction) in the internal space of the housing 110. The first moving body 120 may have a substantially hexahedral shape.

The second moving body 130 is provided in the first moving body 120 to be movable in an internal space of the first moving body 120. For example, the second moving body 130 is provided in the first moving body 120 to be movable in two axial directions (for example, an X-axis direction and a Y-axis direction).

A plurality of lenses (not shown) may be provided inside the second moving body 130.

The OIS driving member 140 includes an OIS driving wire 141, formed of a shape memory alloy (SMA) and provided with a plurality of OIS driving wires, a first board 142, and a second board 143 disposed in an internal portion of the first board 142.

The first board 142 may be attached to a top surface or a bottom surface of the first moving body 120. A bonding pad 142a may be provided on the first board 142 to fix the OIS driving wire 141. As an example, the bonding pad 142a may be formed of a metal material, for example, a conductive material such as copper, gold, or the like.

The second board 143 may be attached to a top surface or a bottom surface of the second moving body 130. A bonding pad 143a may be provided on the top surface or the bottom surface of the second board to fix the OIS driving wire 141. As an example, the bonding pad 143a may be formed of a metal material, for example, a conductive material such as copper, gold, or the like.

The first and second boards 142 and 143 may be integrally manufactured, and the OIS driving wire 141 may be bonded to the first and second boards 142 and 143. The first and second boards 142 and 143 provided with the OIS driving wire 141 may be separated and respectively attached to the first and second moving bodies 120 and 130.

The OIS driving wire 141 has one end disposed on an edge side of the first moving body 120 and the other end bonded to the bonding pads 143a disposed adjacent to central axes of the second moving body 120 (for example, the X axis and the Y axis). The OIS driving wire 141 may include a pair of OIS driving wires disposed on four side surfaces of the first and second moving bodies 120 and 130. In the present example, a total of eight OIS driving wires 141 are provided. As illustrated in further detail in FIG. 5, two OIS driving wires 141 are disposed on both sides of the second moving body 130 to move the second moving body 130 in the X-axis direction, and two OIS driving wires 141 are disposed on the other two sides of the second moving body 130 to move the second moving body 130 in the Y-axis direction.

The OIS driving wire 141 may have end portions bonded to the bonding pads 142a and 143a respectively provided on the first and second boards 142 and 143. After being formed to have a ball shape due to local heating caused by spark discharge, both end portions of the OIS driving wire 141 may be bonded to the respective bonding pads 142a and 143a by ultrasonic vibrations.

For example, the end portions of the OIS driving wire 141 may be bonded to the respective bonding pads 142a and 143a by heating caused by spark discharge and ultrasonic vibrations through wire bonding equipment. Accordingly, mass production may be achieved and production yield may be improved. Moreover, thermal damage, occurring during an assembly process of the OIS driving wire 141, may be suppressed.

The OIS driving wire 141 may be made of a material such as a nickel-titanium alloy, a copper-zinc alloy, a gold-cadmium alloy, an indium-thallium alloy, or the like.

The AF driving member 150 includes an AF driving wire 152 disposed on at least one side surface of the first moving body 120 and formed of a shape memory alloy. As an example, the AF driving member 150 may include an AF driving wire 152, a frame portion 154, and a mounting bar 156. The mounting bar 156 is disposed in a central portion of the frame portion 154 in a length direction of the frame portion 154. The frame portion 154 and the mounting bar 156 may be manufactured from a board including an insulator and a wiring pattern. The frame portion 154 and the mounting bar 156 are integrally provided when they are manufactured. Then, the mounting bar 156 may be separated from the frame portion 154 when the frame portion 154 is attached to the housing 110 and the mounting bar 156 is attached to the first moving body 120.

The AF driving wire 152 includes a first AF driving wire 152a, connected to an upper portion of the frame portion 154, and a second AF driving wire 152b connected to a lower portion of the frame portion 154. Each of the first and second AF driving wires 152a and 152b includes two driving wires. For example, the AF driving wire 152 may include a total of four driving wires.

The frame portion 154 and the mounting bar 156 may be provided with bonding pads 154a and 156a. The bonding pad 154a, provided on the frame portion 154, is disposed adjacent to the edge side of the frame portion 154, and the bonding pad 156a, provided on the mounting bar 156, is disposed in a central portion of the bonding bar 156.

The AF driving wire 152 may be bonded to the bonding pads 154a and 156a provided on the frame portion 154 and the mounting bar 156. After being formed to have a ball shape due to local heating caused by spark discharge, end portions of the AF driving wire 152 may be bonded to the respective bonding pads 154a and 156a by ultrasonic vibrations.

For example, end portions of the AF driving wire 152 may be bonded to the respective bonding pads 154a and 156a by heating caused by spark discharge and ultrasonic vibrations through wire bonding equipment. Accordingly, mass production may be achieved and the production yield may be improved. Moreover, a thermal damage occurring during an assembly process of the AF driving wire 152 may be suppressed.

The AF driving wire 152 may be formed of a material such as a nickel-titanium alloy, a copper-zinc alloy, a gold-cadmium alloy, an indium-thallium alloy, or the like.

The reinforcing member 180 is disposed to cover the bonding pads 142a, 143a, 154a, and 156a. As an example, the reinforcing member 180 may be formed of a synthetic resin material, and the reinforcing member 180 may be formed of a material cured by heat or ultraviolet rays. The reinforcing member 180 serves to prevent the OIS driving wire 141 and the AF driving wire 152 from being separated from the bonding pads 142a, 143a, 154a, 156a by an external impact.

As described above, since the OIS driving wire 141 and the AF driving wire 152 may be provided by omitting a clamping process, the manufacturing process may be simplified.

After being fused by local heating caused by spark discharge, end portions of the OIS driving wire 141 and the AF driving wire 152 may be bonded to the respective connection pads 142a, 143a, 154a, and 156a by ultrasonic vibrations to suppress thermal deformation of the OIS driving wire 141 and the AF driving wire 152.

Since the OIS driving wire 141 is bonded to the first and second boards 142 and 143 before the first and second boards 142 and 143 are attached to the first and second moving bodies 120 and 130, a length of the OIS driving wire 141 may be easily managed.

Since the AF driving wire 152 is bonded to the frame portion 154 and the mounting bar 156 before the AF driving member 150 is attached to the housing 110 and the first moving body 120, a length of the AF driving wire 152 may be easily managed.

Furthermore, power consumption may be reduced by removing frictional force generated by interference between the OIS driving wire 141 and the AF driving wire 152, and a structure. At the same time, movements of the first and second moving bodies 120 and 130 may be easily controlled by removing the frictional force.

Additionally, the OIS driving wire 141 is bonded to the first and second boards 142 and 143. The frame portion 154 and the mounting bar 156 of the AF driving member 150 are manufactured from a board, and the AF driving wire 152 is bonded to the frame portion 154 and the mounting bar 156 when the frame portion 154 and the mounting bar 156 are manufactured. The first and second boards 142 and 143, to which the OIS driving wire 141 is bonded, are attached to the first and second moving bodies 120 and 130. The frame portion 154 and the mounting bar 156, to which the AF driving wire 152 is bonded, are attached to the housing 110 and the first moving body 120. Accordingly, mass production may be achieved.

For example, after the OIS driving member 140 including the first and second boards 142 and 143 and the OIS driving wire 141 is manufactured by one subassembly and the AF driving member 150 is manufactured by another subassembly, the OIS driving member 140 and the AF driving member 150 may be assembled together. Accordingly, mass production may be achieved.

Hereinafter, an OIS driving method of the camera module according to the first example will be described with reference to accompanying drawings.

FIGS. 7 to 12 are explanatory views illustrating an OIS driving method of the camera module according to the first example.

Figure 7:
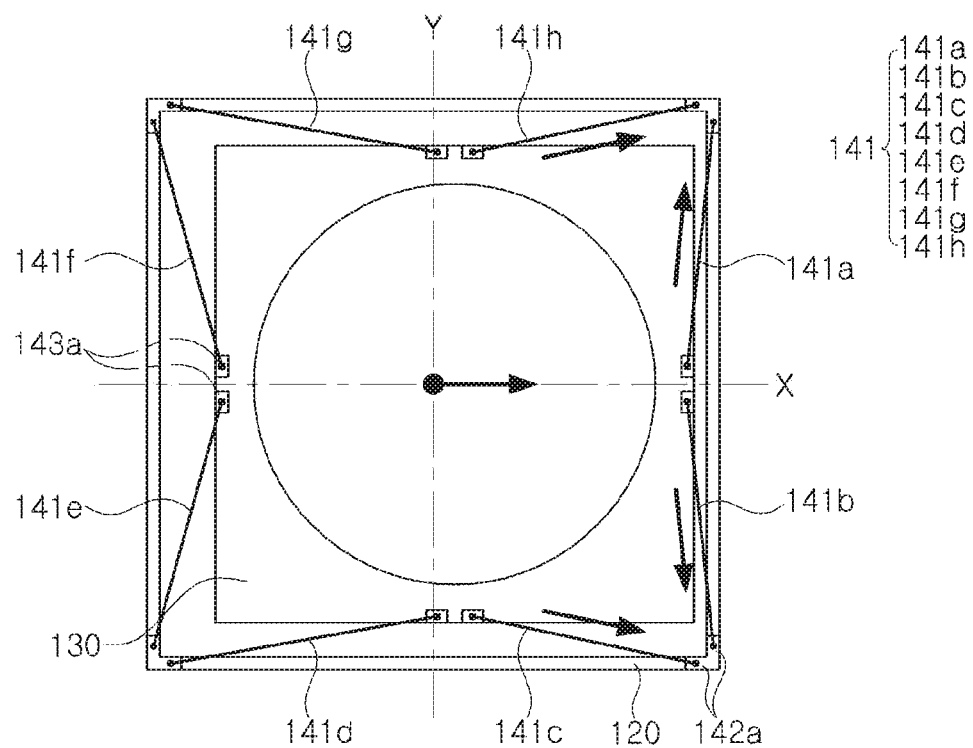
FIGS. 7 to 12 are explanatory views illustrating an OIS driving method of the camera module according to the first example.

Referring to FIG. 7, when the second moving body 130 moves in a plus X-axis direction, first and second OIS driving wires 141a and 141b of an OIS driving wire 141 are contracted. In this case, fifth and sixth OIS driving wires 141e and 141f are extended. Third and the eighth OIS driving wires 141c and 141h are contracted, while fourth and seventh OIS driving wires 141d and 141g are extended.

Figure 8:
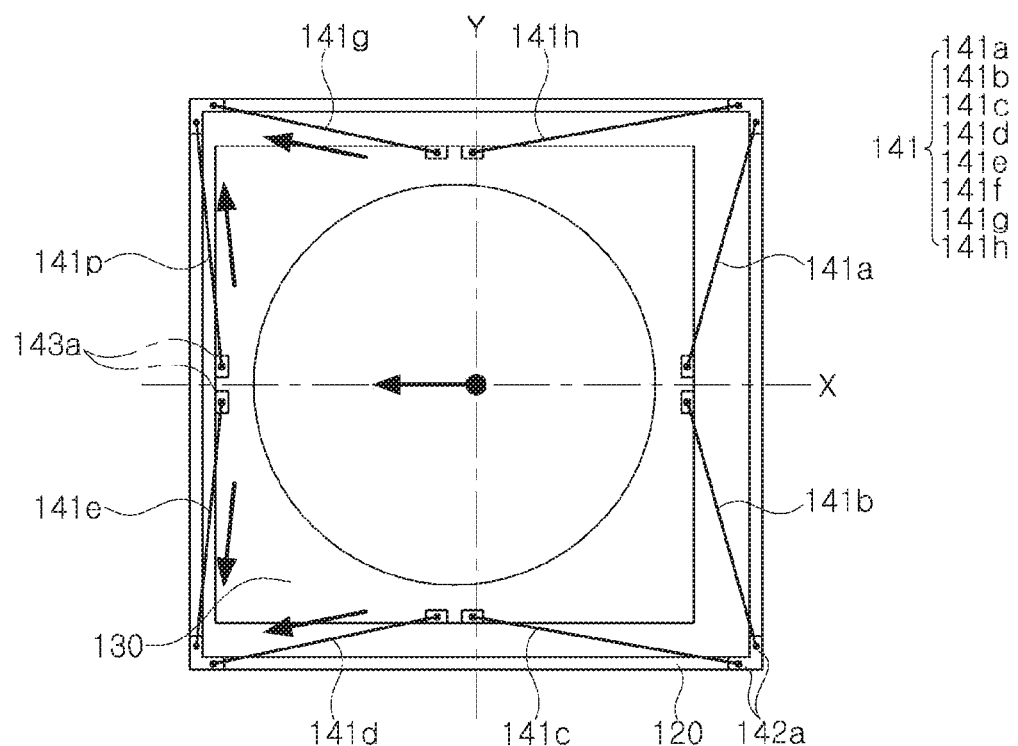

Referring to FIG. 8, when the second moving body 130 moves in a minus X-axis direction, the fifth and sixth driving wires 141e and 141f of the OIS driving wire 141 are contracted. In this case, the first and second OIS driving wires 141a and 141b are extended. Third and eighth OIS driving wires 141c and 141h are extended, while fourth and seventh OIS driving wires 141d and 141g are contracted.

Figure 9:
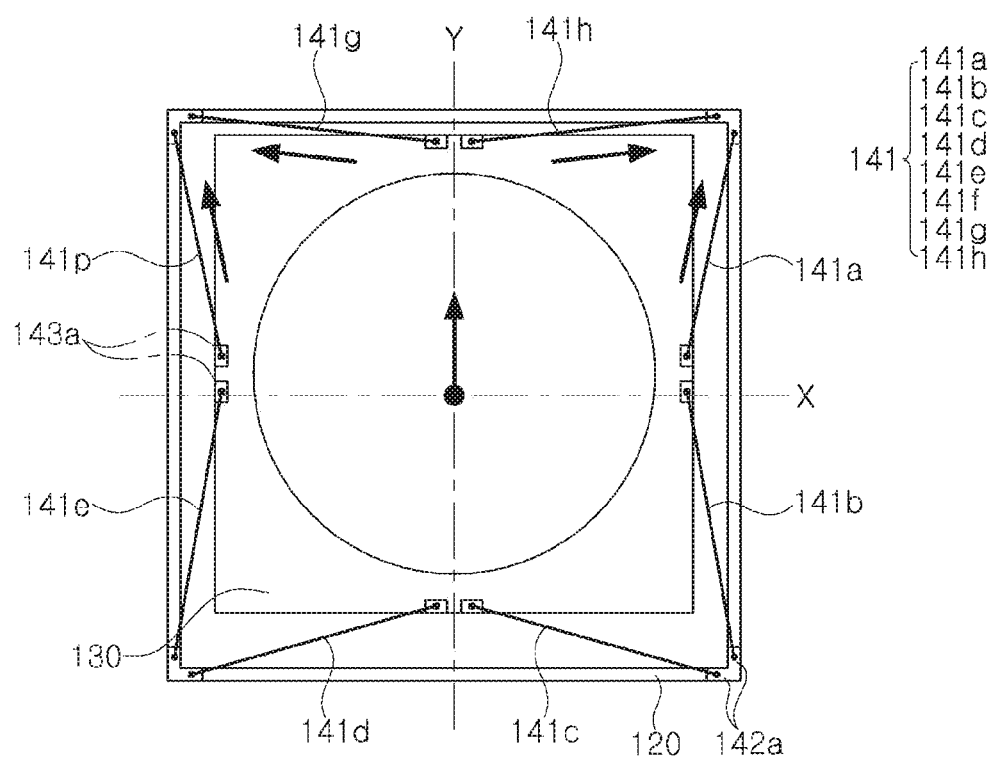

Referring to FIG. 9, when the second moving body 130 moves in a plus Y-axis direction, seventh and eighth OIS driving wires 141g and 141h of the OIS driving wire 141 are contracted. In this case, third and fourth OIS driving wires 141c and 141d are extended. First and sixth OIS driving wires 141a and 141f are contracted, while second and fifth OIS driving wires 141b and 141e are extended.

Figure 10:
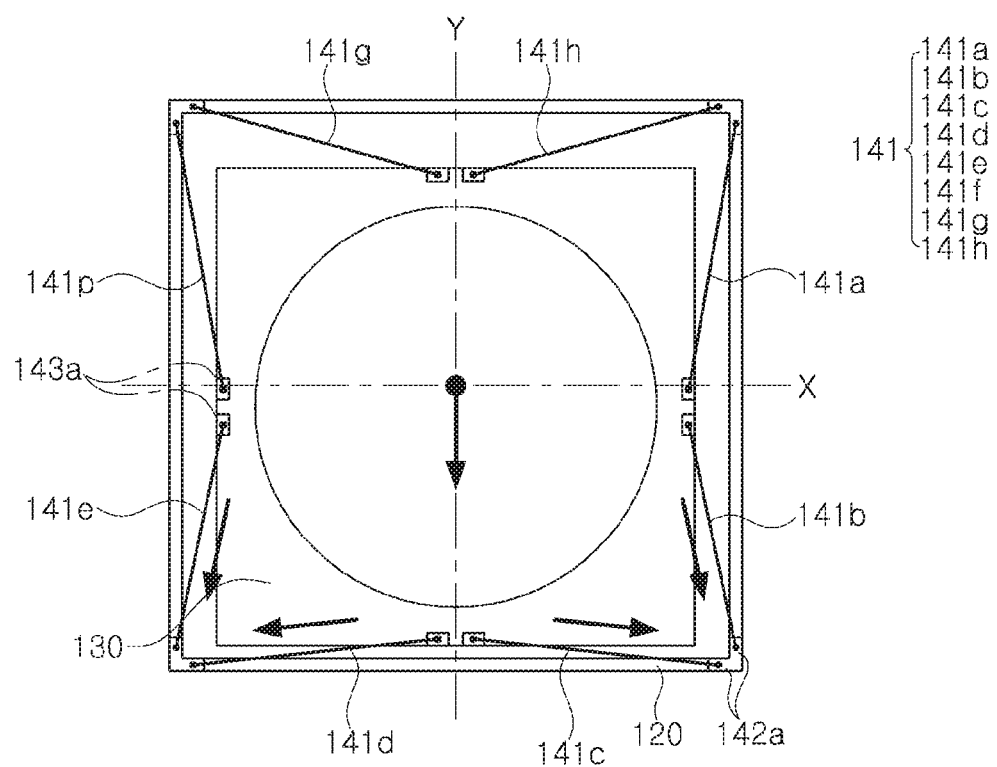

Referring to FIG. 10, when the second moving body 130 moves in a minus Y-axis direction, third and fourth OIS driving wires 141c and 141d of the OIS driving wire 141 are contracted. In this case, seventh and eighth OIS driving wires 141g and 141h are extended. First and sixth OIS driving wires 141a and 141f are extended, while second and fifth OIS driving wires 141b and 141e are contracted.

Figure 11:
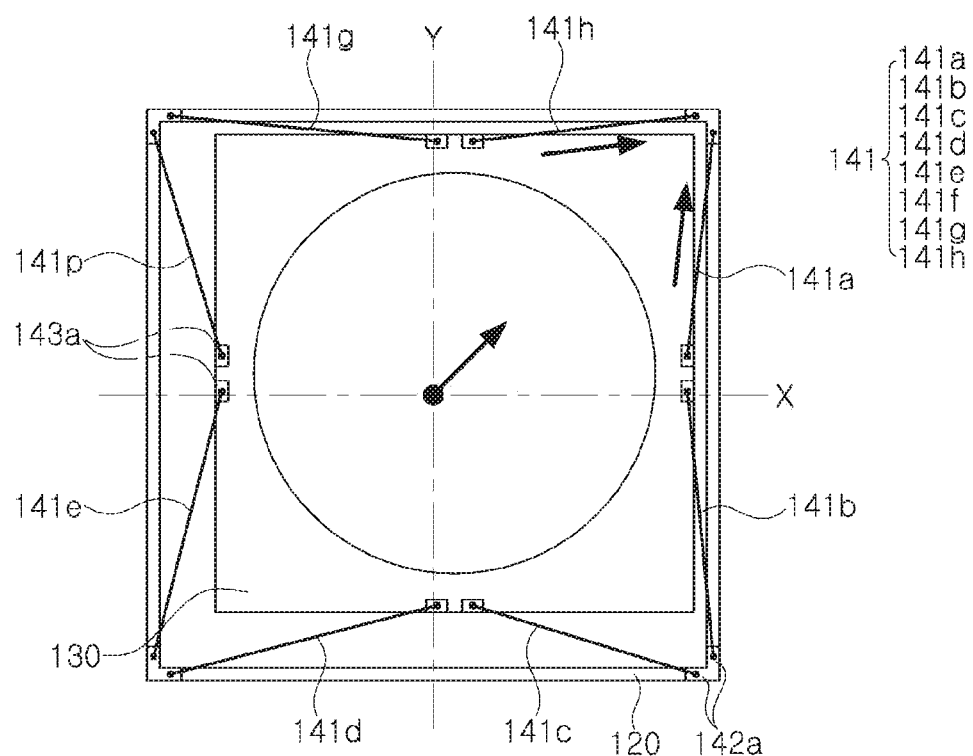

Referring to FIG. 11, when the second moving body 130 moves in a plus XY-axis direction, first and eighth OIS driving wires 141a and 141h of the OIS driving wire 141 are contracted, while second and seventh OIS driving wires 141b and 141g are extended. In addition, fourth and fifth OIS driving wires 141d and 141e are extended. In this case, third and the sixth OIS driving wires 141c and 141f are contracted. The amount of contraction of the first and eighth OIS driving wires 141a and 141h is greater than the amount of contraction of the third and sixth OIS driving wires 141c and 141f. The amount of extension of the second and seventh OIS driving wires 141b and 141g is greater than the amount of extension of the fourth and fifth OIS driving wires 141d and 141e.

Figure 12:
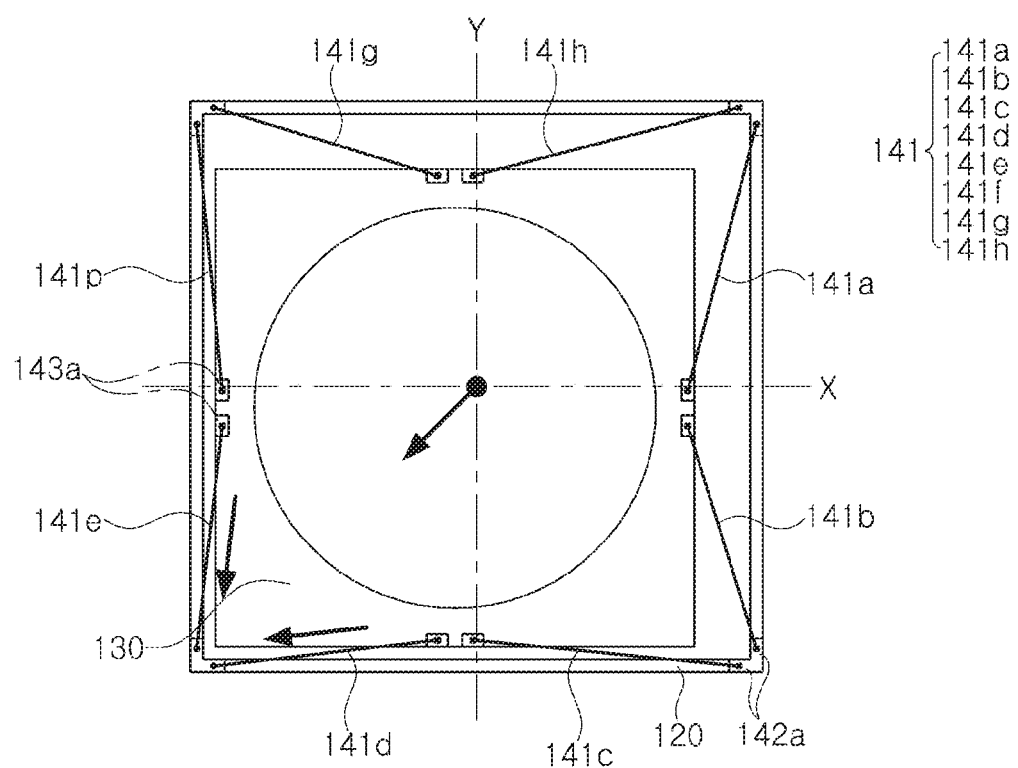

Referring to FIG. 12, when the second moving body 130 moves in a minus XY-axis direction, fourth and fifth OIS driving wires 141d and 141e are contracted, while third and sixth OIS driving wires 141c and 141f are extended. In addition, second and seventh OIS driving wires 141b and 141g are contracted, while first and eighth OIS driving wires 141a and 141h are extended. The amount of contraction of the fourth and fifth OIS driving wires 141d and 141e is greater than the amount of contraction of the second and seventh OIS driving wires 141b and 141g. The amount of extension of the third and sixth OIS driving wires 141c and 141f is greater than the amount of extension of the first and eighth OIS driving wires 141a and 141h.

Hereinafter, a camera module according to a second example will be described with reference to accompanying drawings.

Figure 13:
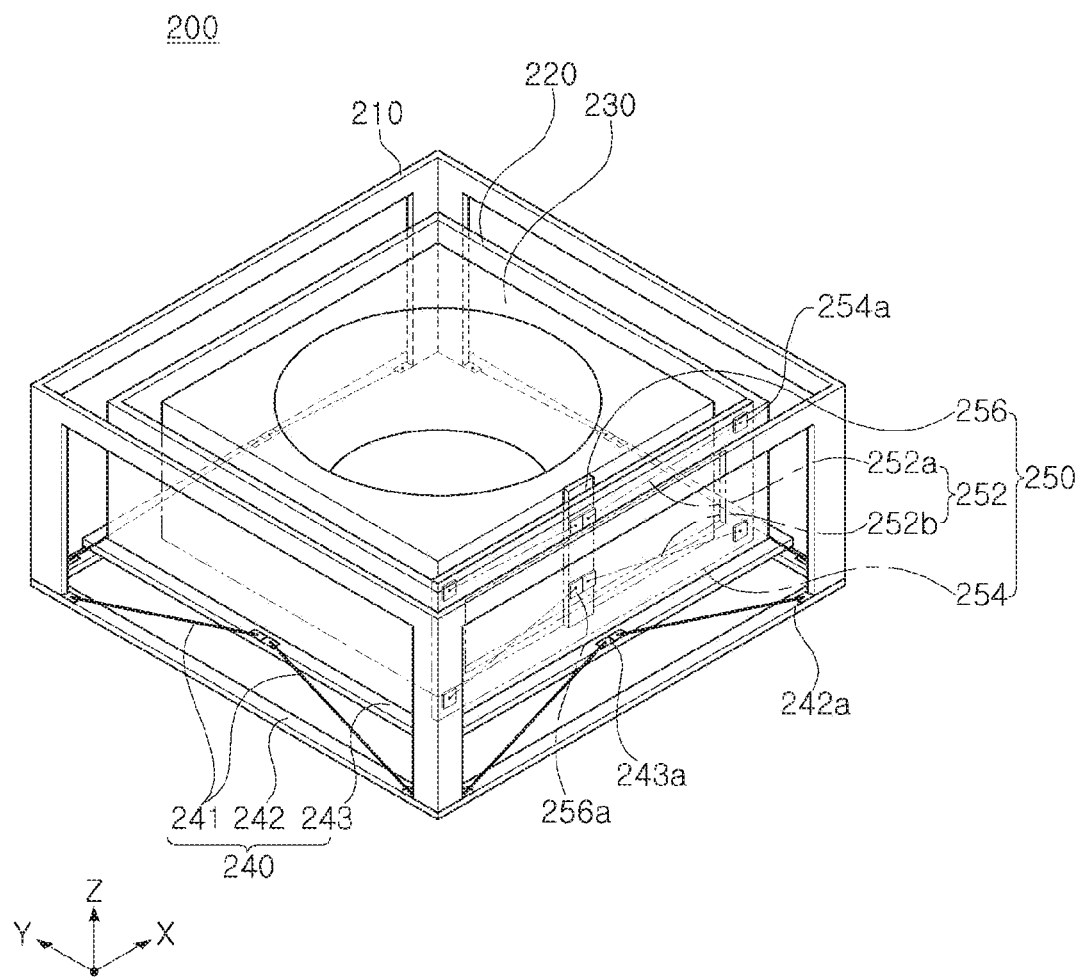
FIG. 13 is a schematic perspective view of a camera module according to a second example.
Figure 14:
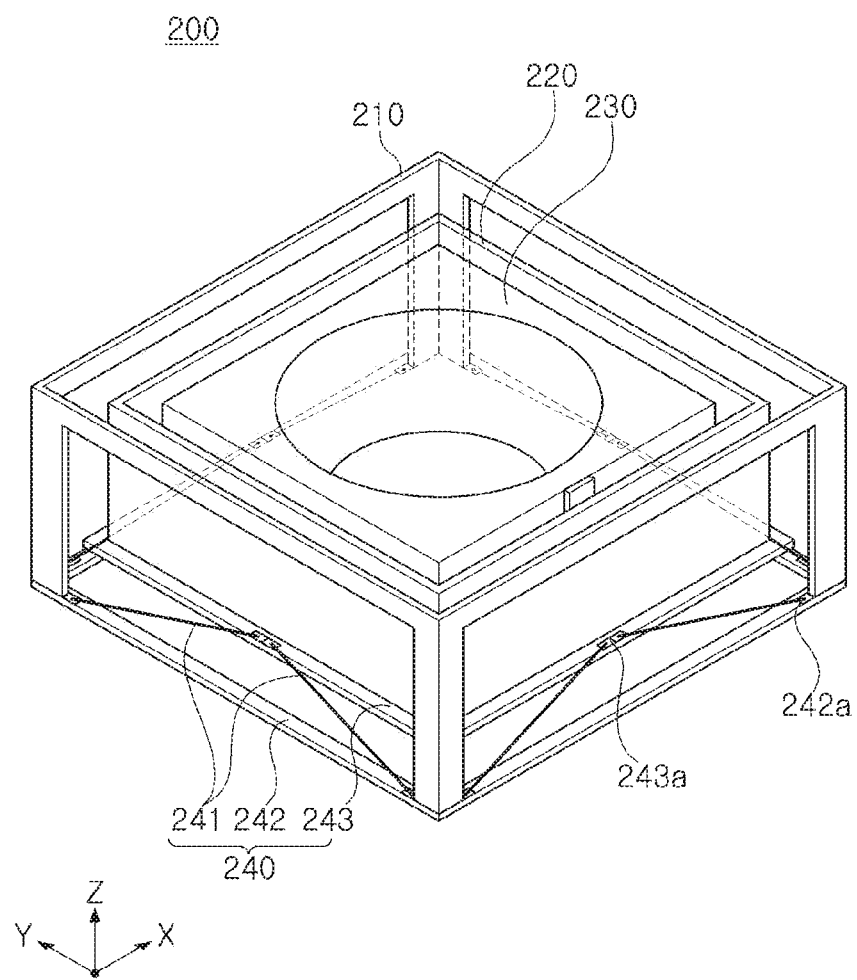
FIG. 14 is an explanatory view illustrating an OIS driving member of the camera module according to the second example.
Figure 15:
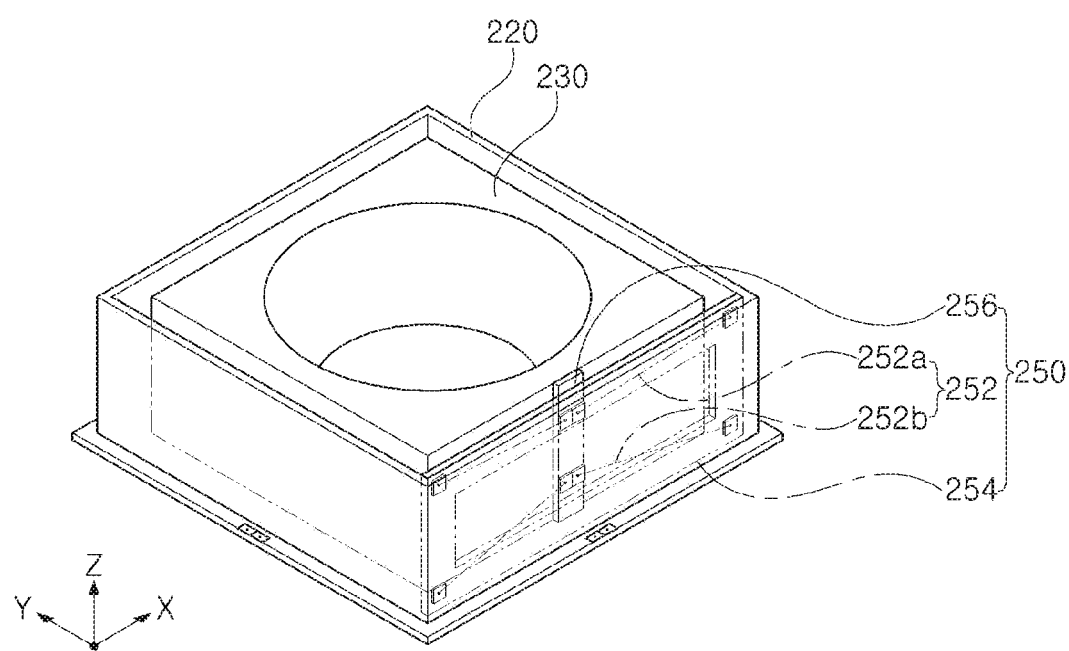
FIG. 15 is an explanatory view illustrating an AF driving member of the camera module according to the second example.

FIG. 13 is a schematic perspective view of a camera module according to a second example, FIG. 14 is an explanatory view illustrating an OIS driving member of the camera module according to the second example, and FIG. 15 is an explanatory view illustrating an AF driving member of the camera module according to the second example.

Referring to FIGS. 13 to 15, a camera module 200 may be configured to include a housing 210, a first moving body 220, a second moving body 230, an OIS driving member 240, and an AF driving member 250.

The housing 210 may have an internal space and may have a substantially hexahedral frame shape. As an example, an opening (not shown) may be formed in at least a bottom surface of the housing 210.

The first moving body 220 is provided in the housing 210 to be movable in the internal space of the housing 210. As an example, the first moving body 220 is moved in the internal space of the housing 210 in two axial directions (for example, an X-axis and a Y-axis direction). In addition, the first moving body 220 may have a substantially hexahedral shape.

The second moving body 230 is provided in the first moving body 220 to be movable in the internal space of the first moving body 220. For example, the second moving body 230 is provided in the first moving body 220 to be movable in one axial direction (for example, a Z-axis direction). A plurality of lenses (not shown) may be mounted inside the second moving body 230.

The OIS driving member 240 includes an OIS driving wire 241, formed of a shape memory alloy (SMA), including a plurality of OIS driving wires 241, a first board 242 attached to the housing 210, and a second board 243 disposed in an internal portion of the first board 242.

The first board 242 may be attached to a top surface or a bottom surface of the housing 210. The first board 242 may be provided with a bonding pad 242a for fixing the OIS driving wire 241. As an example, the bonding pad 242a may be formed of a metal material, for example, a conductive material such as copper, gold, or the like.

The second board 243 may be attached to a top surface or a bottom surface of the first moving body 220. A bonding pad 243a may be provided on a top surface or a bottom surface of the second board 243 to fix the OIS driving wire 241. As an example, the bonding pad 243a may be formed of a metal material, for example, a conductive material such as copper, gold, or the like.

The first and second boards 242 and 243 may be integrally manufactured, and the OIS driving wire 241 may be bonded to the first and second boards 242 and 243. The first and second boards 242 and 243 provided with the OIS driving wire 241 may be separated and respectively attached to the housing 210 and the first moving body 220.

The OIS driving wire 241 has one end bonded to the bonding pad 242a, disposed on an edge side of the housing 210, and the other end bonded to the bonding pad 243a disposed adjacent to central axes of the first moving body 220 (for example, the X axis and the Y axis). The OIS driving wire 241 may include a pair of OIS driving wires 241 respectively disposed at four side surfaces of the housing 210 and the first moving body 220. In the present example, a total of eight OIS driving wires 141 are provided. For example, two OIS driving wires 141 are respectively disposed on both sides of the first moving body 220 to move the second moving body 230 in the X-axis direction, and two OIS driving wires 141 are respectively disposed on the other two sides of the first moving body 220 to move the first moving body 220 in the Y-axis direction.

End portions of the OIS driving wire 241 may be bonded to the respective bonding pads 242a and 243a provided on the first and second boards 242 and 243. After being formed to have a ball shape due to local heating caused by spark discharge, end portions of the OIS driving wire 241 may be bonded to the respective bonding pads 242a and 243a by ultrasonic vibrations.

For example, end portions of the OIS driving wire 241 may be bonded to the respective bonding pads 242a and 243a by heating caused by spark discharge and ultrasonic vibrations through wire bonding equipment. Accordingly, mass production may be achieved and production yield may be improved. Moreover, a thermal damage, occurring during an assembly process of the OIS driving wire 241, may be suppressed.

The OIS driving wire 241 may be formed of a material such as a nickel-titanium alloy, a copper-zinc alloy, a gold-cadmium alloy, an indium-thallium alloy, or the like.

The AF driving member 250 includes an AF driving wire 252 disposed on at least one side surface of the second moving body 220 and formed of a shape memory alloy. As an example, the AF driving member 250 may include the AF driving wire 252, a frame portion 254, and a mounting bar 256. The frame portion 254 may have a rectangular frame shape, and the mounting bar 256 is disposed in a central portion of the frame portion 254 in a length direction of the frame portion 254. The frame portion 254 and the mounting bar 256 may be formed of a board having an insulator and a wiring pattern. The frame portion 254 and the mounting bar 256 are integrally provided when they are manufactured. Then, the mounting bar 256 is separated from the frame portion 254 to be attached to the first and second moving bodies 220 and 230 when the mounting bar 256 is attached to the first and second moving bodies 220 and 230.

The AF driving wire 252 includes a first AF driving wire 252a, connected to an upper end of the frame portion 254, and a second AF driving wire 252b connected to a lower portion of the frame portion 254. Each of the first and second AF driving wires 252a and 252b includes two driving wires. For example, the AF driving wire 252 may include a total of four driving wires.

The frame 254 and the mounting bar 256 may be provided with bonding pads 254a and 256a. The bonding pad 254a provided on the frame portion 254 is disposed adjacent to an edge side of the frame portion 254, and the bonding pad 256a provided on the mounting bar 256 is disposed adjacent to a central portion of the mounting bar 256.

The first and second AF driving wires 252a and 252b may be bonded to the bonding pads 254a and 256a provided on both of the frame portion 254 and the mounting bar 256. After both end portions of the AF driving wire 252 are formed to have a ball shape due to local heating caused by spark discharge, the AF driving wire 252 may be bonded to the bonding pads 254a and 256a by ultrasonic vibrations.

For example, end portions of the AF driving wire 252 may be bonded to the respective bonding pads 254a and 256a by heating by spark discharge and ultrasonic vibrations through wire bonding equipment. Accordingly, mass production may be achieved and the production yield may be improved. Moreover, a thermal damage, occurring during an assembly process of the AF driving wire 252, may be suppressed.

The AF driving wire 252 may be formed of a material such as a nickel-titanium alloy, a copper-zinc alloy, a gold-cadmium alloy, an indium-thallium alloy, or the like.

As described above, since the OIS driving wire 241 and the AF driving wire 252 may be provided by omitting a clamping process, a manufacturing process may be simplified.

After being fused by local heating caused by spark discharge, end portions of the OIS driving wire 241 and the AF driving wire 252 may be bonded to the respective bonding pads 242a, 243a, 254a, and 256a by ultrasonic vibrations to suppress thermal deformation of the OIS driving wire 241 and the AF driving wire 252.

After the OIS driving wire 241 is bonded to the first board 242 and the second board 243, the first board 242 and the second board 243 are separated from each other to be attached to the housing 210 and the first moving body 220, respectively. Accordingly, a length of the OIS driving wire 241 may be easily managed.

After the AF driving wire 252 is bonded to the frame portion 254 and the mounting bar 256 when the AF driving member 250 is manufactured, the frame portion 254 and the mounting bar 256 are attached to the first and second moving bodies 220 and 230. Accordingly, a length of the AF driving wire 252 may be easily managed.

Furthermore, power consumption may be reduced by removing frictional force generated by interference between the OIS driving wire 241 and the AF driving wire 252, and a structure. At the same time, movements of the first and second moving bodies 220 and 230 may be easily controlled by removing the frictional force.

Additionally, the first board 242, the second board 243, and the OIS driving wire 241 may be manufactured by one subassembly and the AF driving member 250 may be manufactured by another subassembly to achieve mass production.

Figure 16:
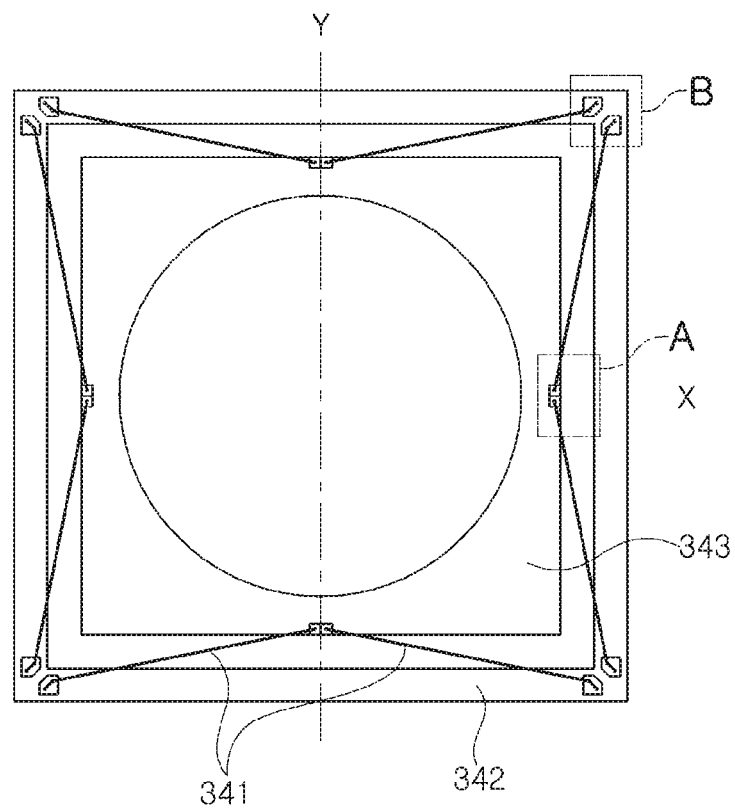
FIG. 16 is a plan view of an OIS driving member according to a first modified example.
Figure 17:
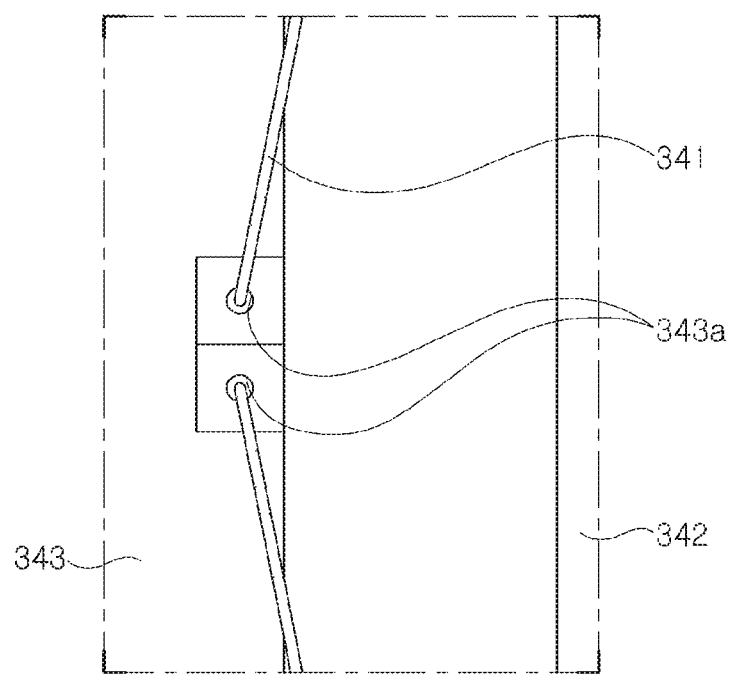
FIG. 17 is an enlarged view of portion A in FIG. 16.
Figure 18:
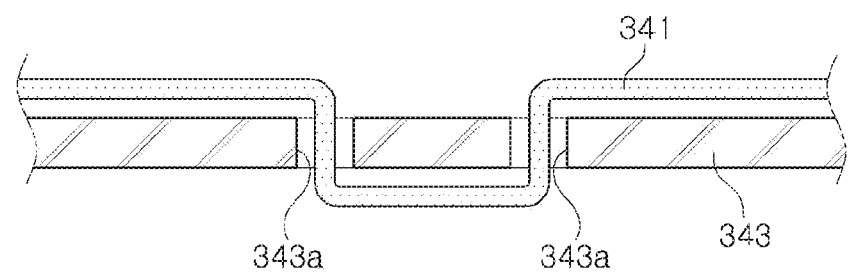
FIG. 18 is a cross-sectional view of portion A in FIG. 16.
Figure 19:
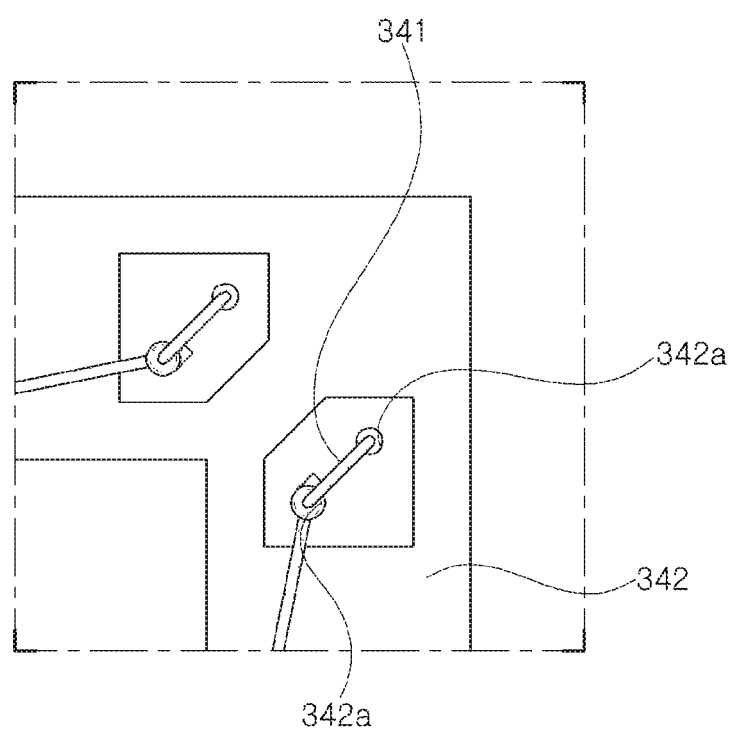
FIG. 19 is an enlarged view of portion B in FIG. 16.
Figure 20:
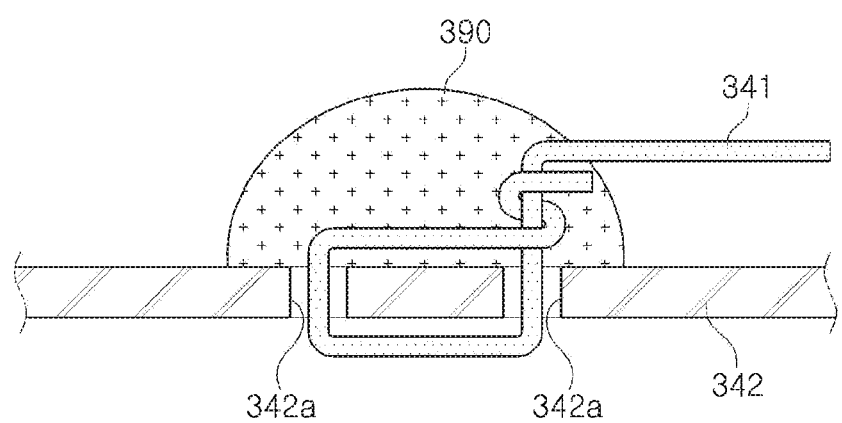
FIG. 20 is a cross-sectional view of portion B in FIG. 16.

FIG. 16 is a plan view of an OIS driving member according to a first modified example, FIG. 17 is an enlarged view of portion A in FIG. 16, FIG. 18 is a cross-sectional view of portion A in FIG. 16, FIG. 19 is an enlarged view of portion B in FIG. 16, and FIG. 20 is a cross-sectional view of portion B in FIG. 16.

Referring to FIGS. 16 to 20, an OIS driving member 340 includes an OIS driving wire 341 and first and second boards 342 and 343, and the OIS driving wire 341 connects the first and the two boards 342 and 343 to each other. A first mounting hole 342a is formed in the first board 342. First mounting holes 342a are formed on edge sides of the first board 342, and the first mounting holes 342a are disposed to include pairs of first mounting holes 342a.

A second mounting hole 343a is formed in the second board 343 and is disposed adjacent to central axes of the second board 343 (for example, an X-axis and a Y-axis). Second mounting holes 343a are also disposed to include a pair of second mounting holes 343a.

The OIS driving wire 341 is mounted on the second board 343 to pass through the second mounting hole 343a of the second board 343, as illustrated in FIG. 18.

As illustrated in FIGS. 19 and 20, both end portions of the OIS driving wire 341 are mounted on the first board 342 to pass through the first mounting hole 342a of the first board 342, and a finishing process thereof is performed using a knot.

Both end portions of the OIS driving wire 341 are covered with an embedding material 390. The embedding material 390 may include soldering or silver paste, and electrical conductivity may be secured by the embedding material 390.

As described above, a total of four OIS driving wires 341 are provided on four side surfaces of the first and second boards 342 and 343.

Although not illustrated in the drawing, an AF driving wire (not shown) may also be provided in the same manner as the OIS driving wire 341. Accordingly, a total of two AF driving wires may be provided.

The OIS driving wire 341 and the AF driving wire may be formed of a material such as a nickel-titanium alloy, a copper-zinc alloy, a gold-cadmium alloy, an indium-thallium alloy, or the like.

FIGS. 21 to 26 are explanatory views illustrating a driving method of the OIS driving member 340 according to the first modified example.

Figure 21:
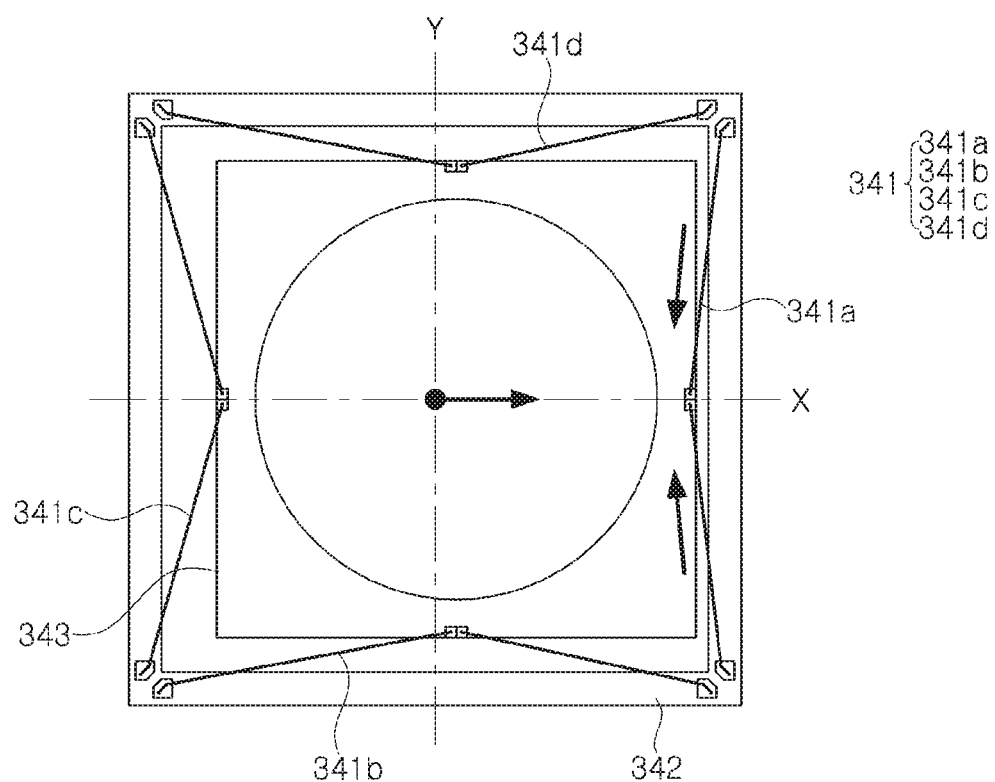
FIGS. 21. 22. 23. 24. 25, and 26 are explanatory views illustrating a driving method of the OIS driving member according to the first modified example.

As illustrated in FIG. 21, when the second board 343 moves in a plus X-axis direction, a first OIS driving wire 341a of the OIS driving wire 341 is contracted. In this case, a third OIS driving wire 341c is extended. Since second and fourth OIS driving wires 341b and 341d are provided to pass through mounting hole 343a of the second board 343, the second board 343 may slidably move along the second and fourth OIS driving wires 341*b* and 341*d* in the plus X-axis direction. Ultimately, the second board 343 may move in the plus X-axis direction.

Figure 22:
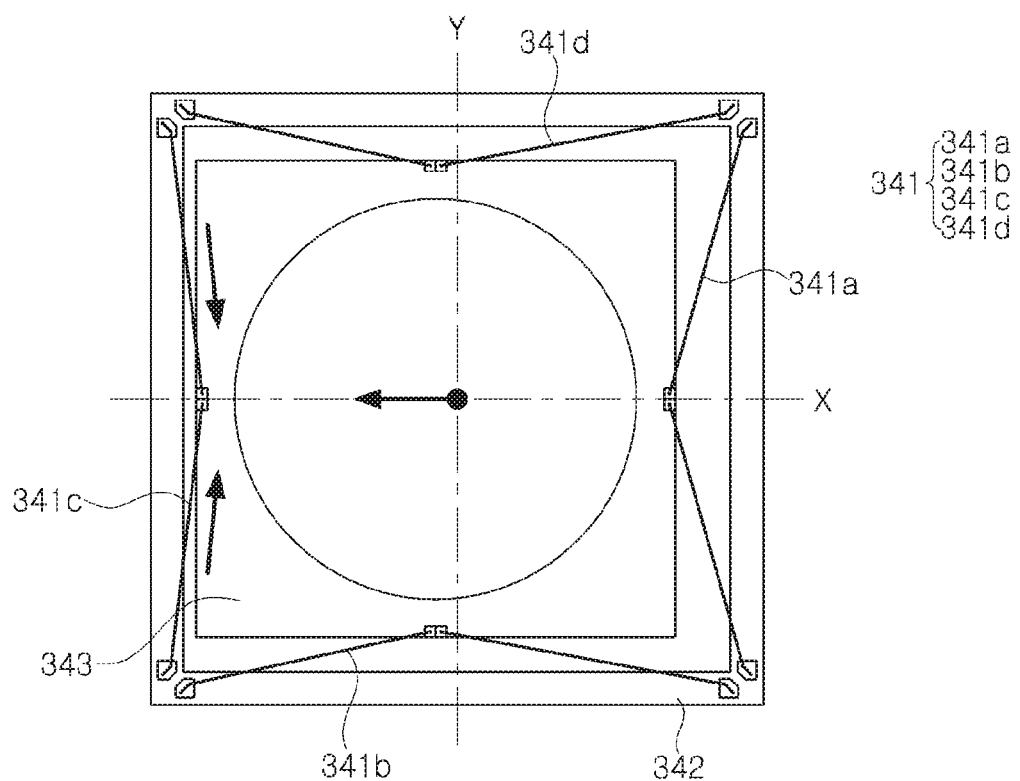

As illustrated in FIG. 22, when the second board 343 moves in a minus X-axis direction, the third OIS driving wire 341*c* is contracted. In this case, the first OIS driving wire 341*a* is extended. Since the second and fourth OIS driving wires 341*b* and 341*d* are provided to pass through mounting holes 343*a* of the second board 343, the second board 343 may slidably move along the second and fourth OIS driving wires 341*b* and 341*d* in the minus X-axis direction. Ultimately, the second board 343 may move in the minus X-axis direction.

Figure 23:
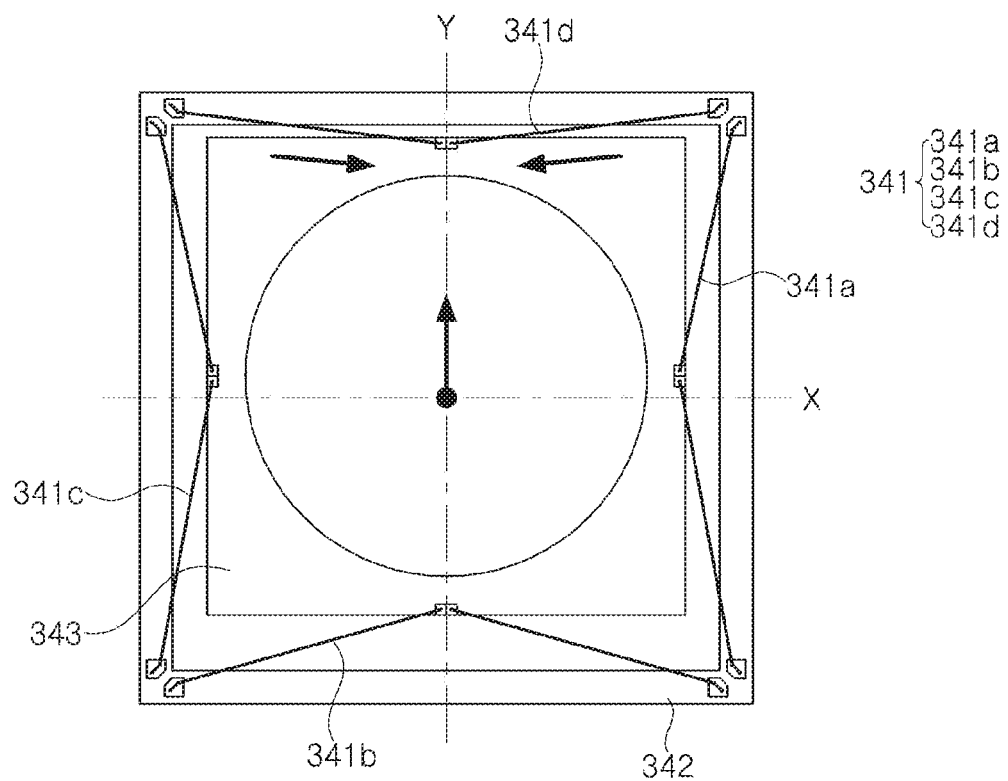

As illustrated in FIG. 23, when the second board 343 moves in a plus Y-axis direction, the fourth OIS driving wire 341*d* is contracted. In this case, the second OIS driving wire 341*b* is extended. Since the first and third OIS driving wires 341*a* and 341*c* are provided so as to pass through mounting holes 343*a* of the second board 343, the second board 343 may slidably move along the first and third OIS driving wires 341*a* and 341*c* in the plus Y-axis direction. Ultimately, the second board 343 may move in the plus Y-axis direction.

Figure 24:
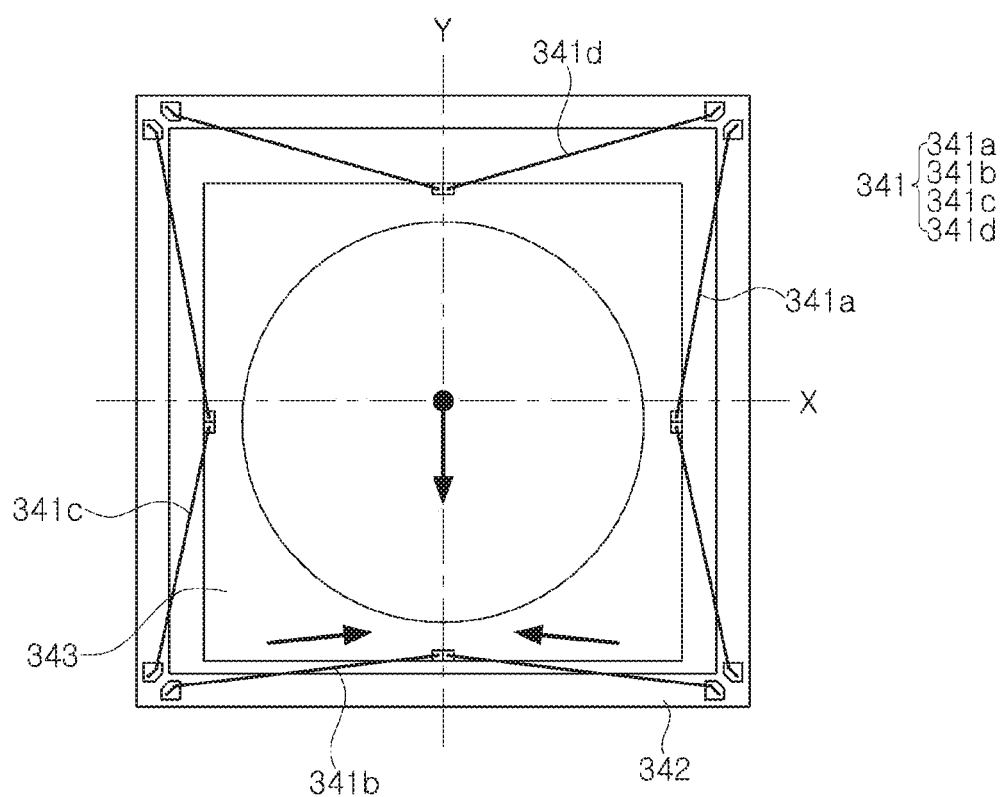

As illustrated in FIG. 24, when the second board 343 moves in a minus Y-axis direction, the fourth OIS driving wire 341*d* is extended while the second OIS driving wire 341*b* is contracted. Since the first and third OIS driving wires 341*a* and 341*c* are provided to pass through mounting holes 343*a* of the second board 343, the second board 343 may slidably move along the first and third OIS driving wires 341*a* and 341*c* in the minus Y-axis direction. Ultimately, the second board 343 may move in the minus Y-axis direction.

Figure 25:
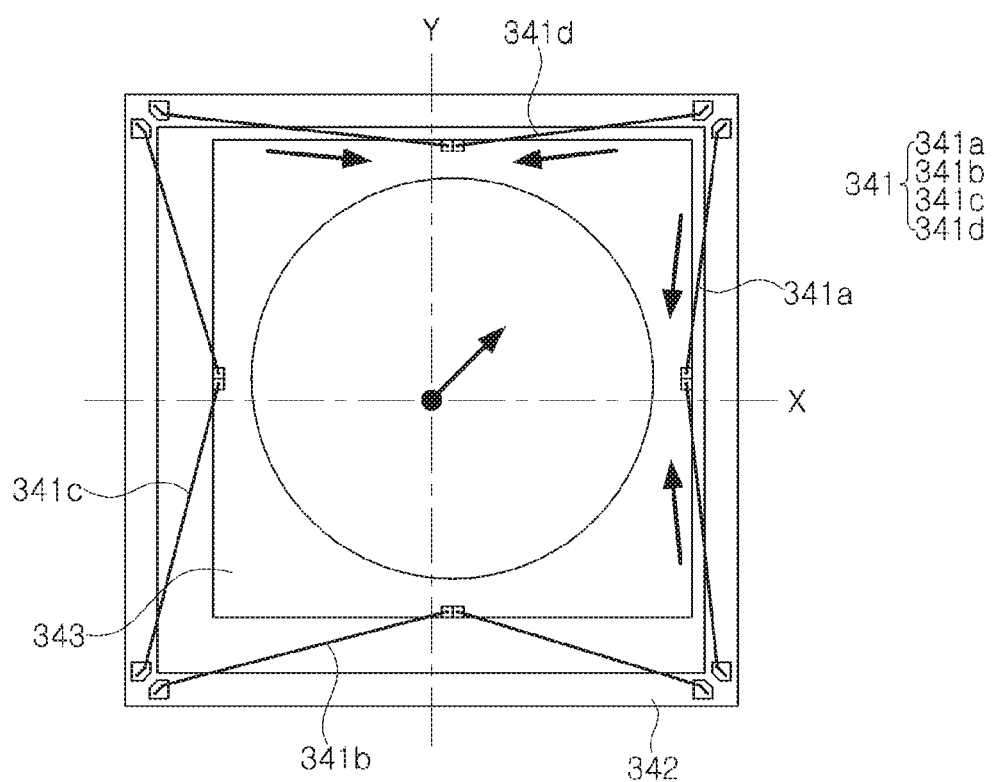

As illustrated in FIG. 25, when the second board 343 moves in a plus XY-axis direction, the first and fourth OIS driving wires 341*a* and 341*d* are contracted. In this case, the second and third OIS driving wires 341*b* and 341*c* are extended. Since the first to fourth OIS driving wires 341*a*, 341*b*, 341*c*, and 341*d* are provided on the second board 343 to pass through mounting holes 343*a* of the second board 343, the second board 343 may move in the plus XY-axis direction while slidably moving with the extension and contraction of the first to fourth OIS driving wires 341*a*, 341*b*, 341*c*, and 341*d*.

Figure 26:
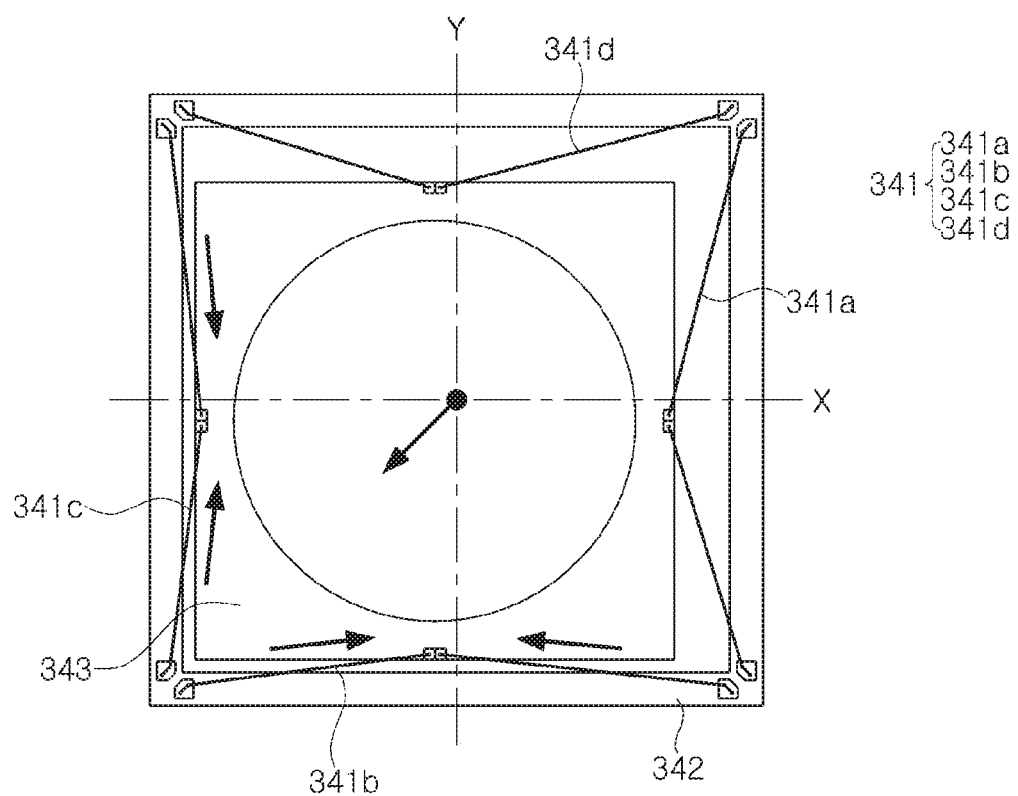

As illustrated in FIG. 26, when the second board 343 moves in a minus XY-axis direction, the second and third OIS driving wires 341*b* and 341*c* are contracted. In this case, the first and fourth OIS driving wires 341*a* and 341*d* are extended. Since the first to fourth OIS driving wires 341*a*, 341*b*, 341*c*, and 341*d* are provided on the second board 343 to pass through mounting holes 343*a* of the second board 343, the second board 343 may move in the minus XY-axis direction while slidably moving with the extension and contraction of the first to fourth OIS driving wires 341*a*, 341*b*, 341*c*, and 341*d*.

Figure 27:
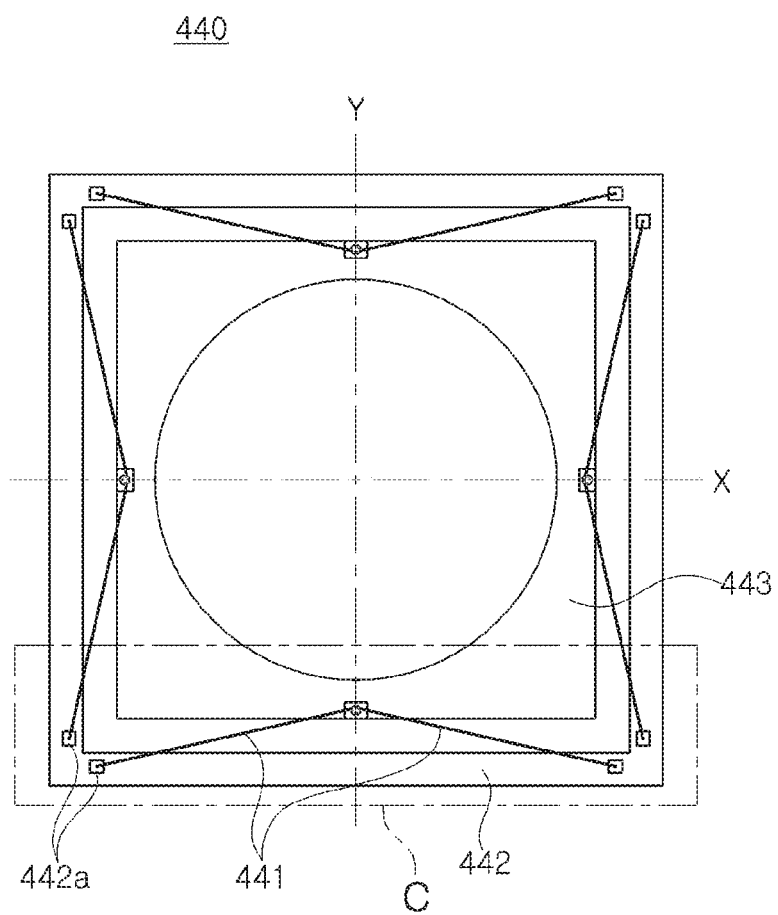
FIG. 27 is a plan view of an OIS driving member according to a second modified example.
Figure 28:
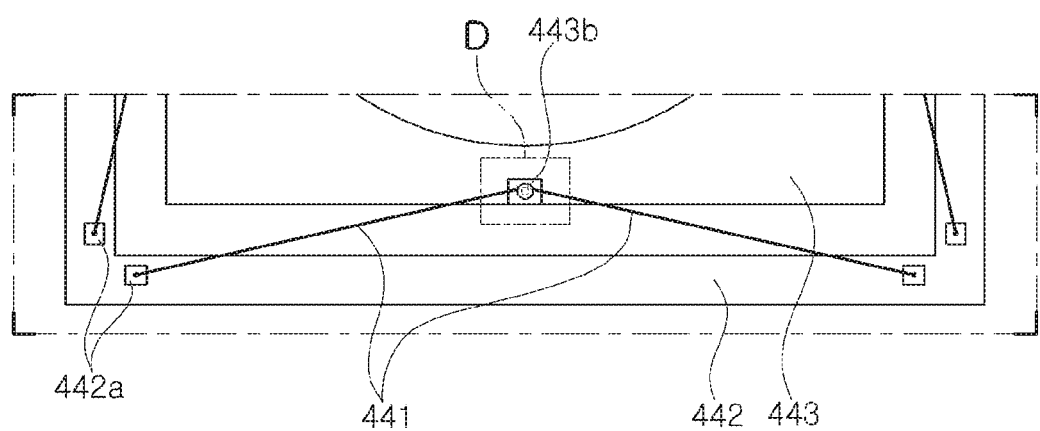
FIG. 28 is an enlarged view of portion C in FIG. 27.
Figure 29:
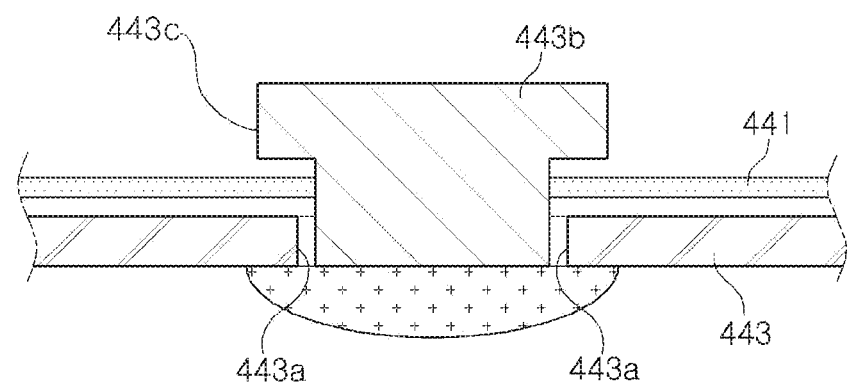
FIG. 29 is a cross-sectional view of portion D in FIG. 28.

FIG. 27 is a plan view of an OIS driving member according to a second modified example, FIG. 28 is an enlarged view of portion C in FIG. 27, and FIG. 29 is a cross-sectional view of portion D in FIG. 28.

Referring to FIGS. 27 to 29, an OIS driving member 440 includes an OIS driving wire 441 and first and second boards 442 and 443, and the OIS driving wire 441 connects the first and second boards 442 and 443 to each other.

The first board 442 is provided with bonding pads 442*a* on respective edge sides thereof, and both ends of the OIS driving wire 441 are bonded to the bonding pads 442*a* of the first board 442. Although not illustrated in the drawings, a reinforcing member (not shown) may be disposed to cover the bonding pads 442*a*.

Mounting holes 443*a* are formed in the second board 443. Mounting holes 443*a* are formed on a top surface of the second board 443 and disposed adjacent to a central axis (for example, an X-axis and a Y-axis). The second board 443 is provided with a guiding member 443*b* to which the OIS driving wire 441 is connected. The guiding member 443*b* is provided in the mounting hole 443*a*. In this case, the guiding member 443*b* is fixed to the second board 443 by soldering. The guiding member 443*b* may be provided with a head portion 443*c* to prevent separation of the OIS driving wire 441.

A portion (for example, a central portion) of the OIS driving wire 441 is supported by the guiding member 443*b*. For example, a total of four OIS driving wires 441 are disposed on four side surfaces of the second board 443.

The OIS driving wire 441 and the AF driving wire (not shown) may be formed of a material such as a nickel-titanium alloy, a copper-zinc alloy, a gold-cadmium alloy, an indium-thallium alloy, or the like FIGS. 30 to 35 are explanatory views illustrating a driving method of the OIS driving member 440 according to the second modified example.

Figure 30:
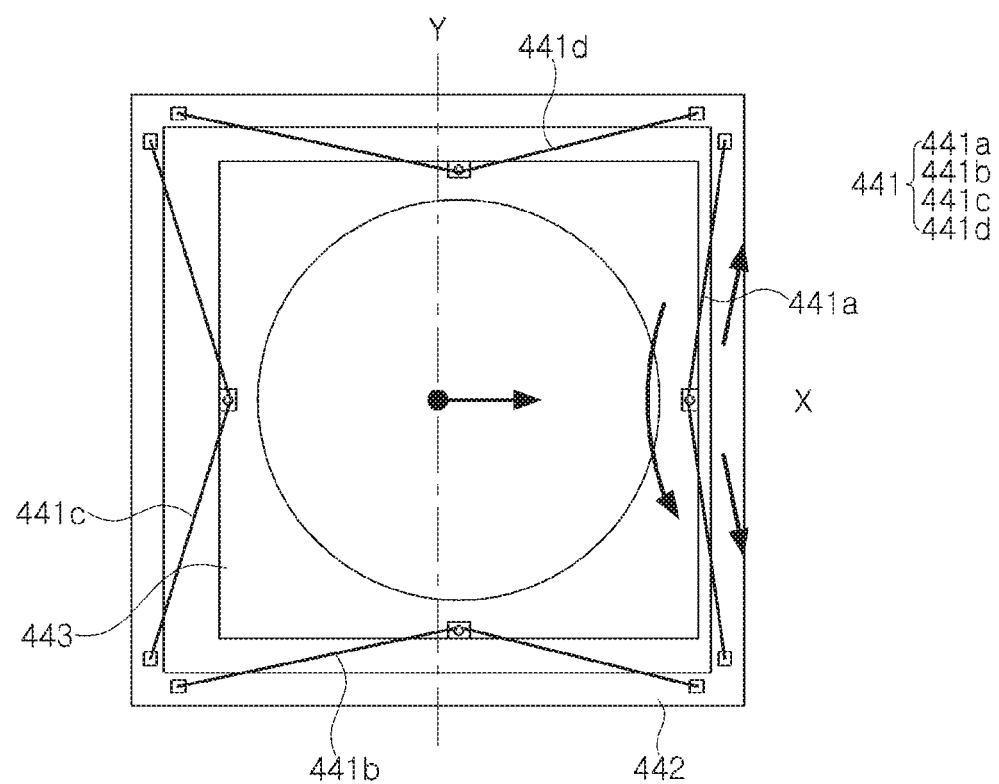
FIGS. 30, 31, 32, 33, 34, and 35 are explanatory views illustrating a driving method of the OIS driving member according to the second modified example.

As illustrated in FIG. 30, when a second board 443 moves in a plus X-axis direction, a first OIS driving wire 441*a* of the OIS driving wire 441 is contracted. In this case, a third OIS driving wire 441*c* is extended. Since second and fourth OIS driving wires 441*b* and 441*d* are connected to the second board 443 and supported by a guiding member 443*b* of the second board 443, the second board 443 may slidably move along the OIS driving wires 441*b* and 441*d* in the plus X-axis direction. Ultimately, the second board 443 may move in the plus X-axis direction.

Figure 31:
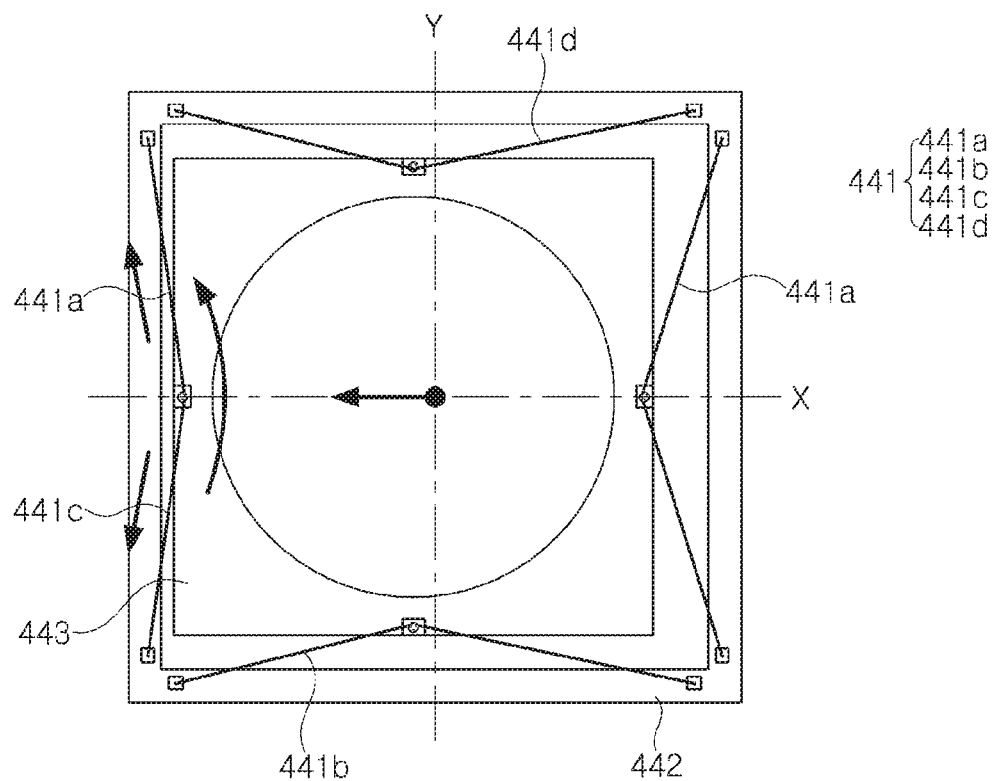

As illustrated in FIG. 31, when the second board 443 moves in a minus X-axis direction, the third OIS driving wire 441*c* is contracted. In this case, the first OIS driving wire 441*a* is extended. Since the second and fourth OIS driving wires 441*b* and 441*d* are connected to the second board 443 and supported by a guiding member 443*b* of the second board 443, the second board 443 may slidably move along the second and fourth OIS driving wires 441*b* and 441*d* in the minus X-axis direction. Ultimately, the second board 443 may move in the minus X-axis direction.

Figure 32:
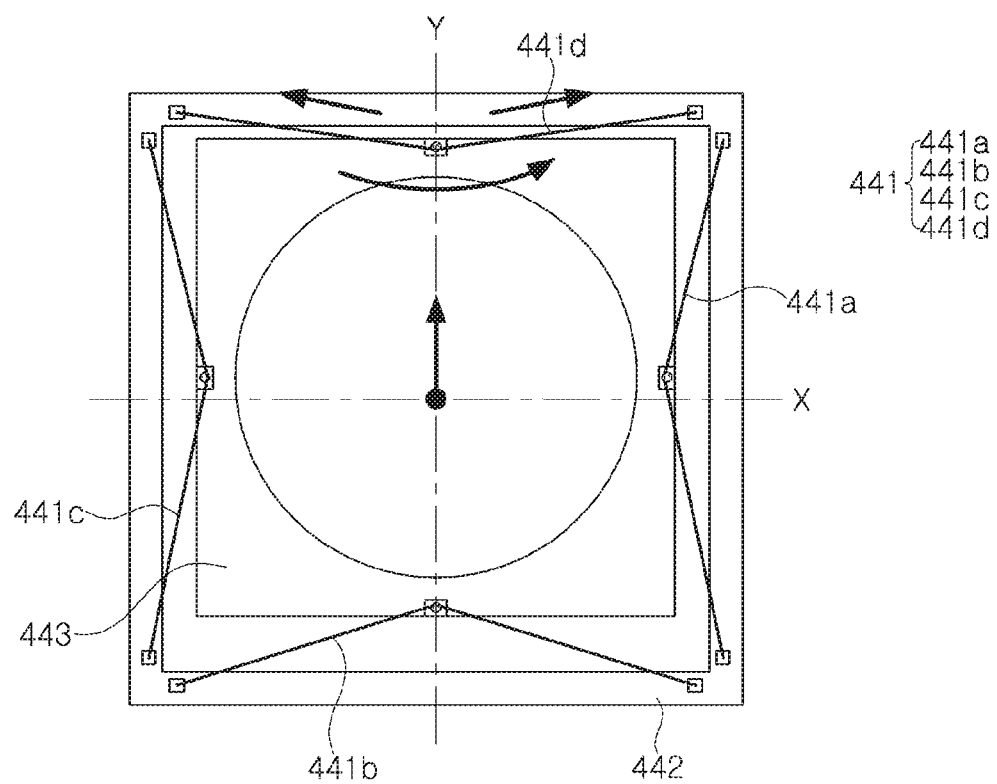

As illustrated in FIG. 32, when the second board 443 moves in the plus Y-axis direction, the fourth OIS driving wire 441*d* is contracted. In this case, the second OIS driving wire 441*b* is extended. Since the first and third OIS driving wires 441*a* and 441*c* are connected to the second board 443 and supported by a guiding member 443*b* of the second board 443, the second board 443 may slidably move along the first and third OIS driving wires 441*a* and 441*c* in the plus Y-axis direction. Ultimately, the second board 443 may move in the plus Y-axis direction.

Figure 33:
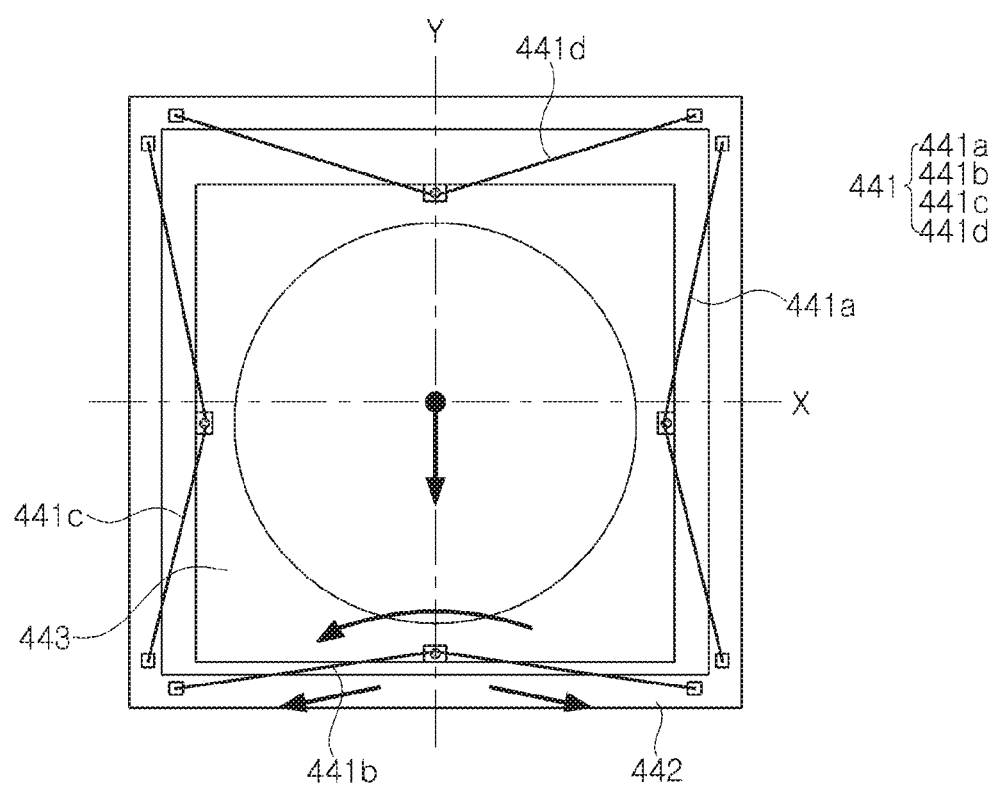

As illustrated in FIG. 33, when the second board 443 moves in a minus Y-axis direction, the fourth OIS driving wire 441*d* is extended while the second OIS driving wire 441*b* is contracted. Since the first and third OIS driving wires 441*a* and 441*c* are connected to the second board 443 and supported by a guiding member 443*b* of the second board 443, the second board may slidably move along the first and third OIS driving wires 441*a* and 441*c* in the minus Y-axis direction. Ultimately, the second board may move in the minus Y-axis direction.

Figure 34:
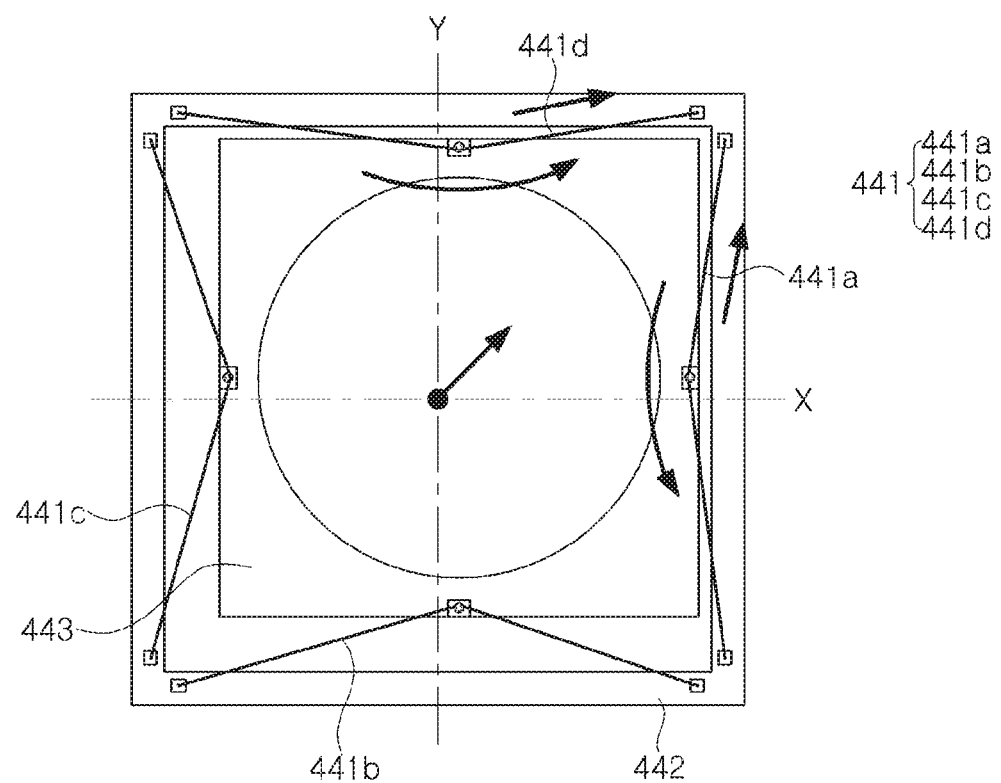

As illustrated in FIG. 34, when the second board 443 moves in a plus XY-axis direction, the first and fourth OIS driving wires 441a and 441d are contracted. In this case, the second and third OIS driving wires 441b and 441c are extended. Since the first to fourth OIS driving wires 441a, 441b, 441c, and 441d are connected to the second board 443 and supported by guiding members 443b of the second board 443, the second board 443 may move in the plus XY-axis direction while slidably moving with the extension and contraction of the first to fourth OIS driving wires 441a, 441b, 441c, and 441d.

Figure 35:
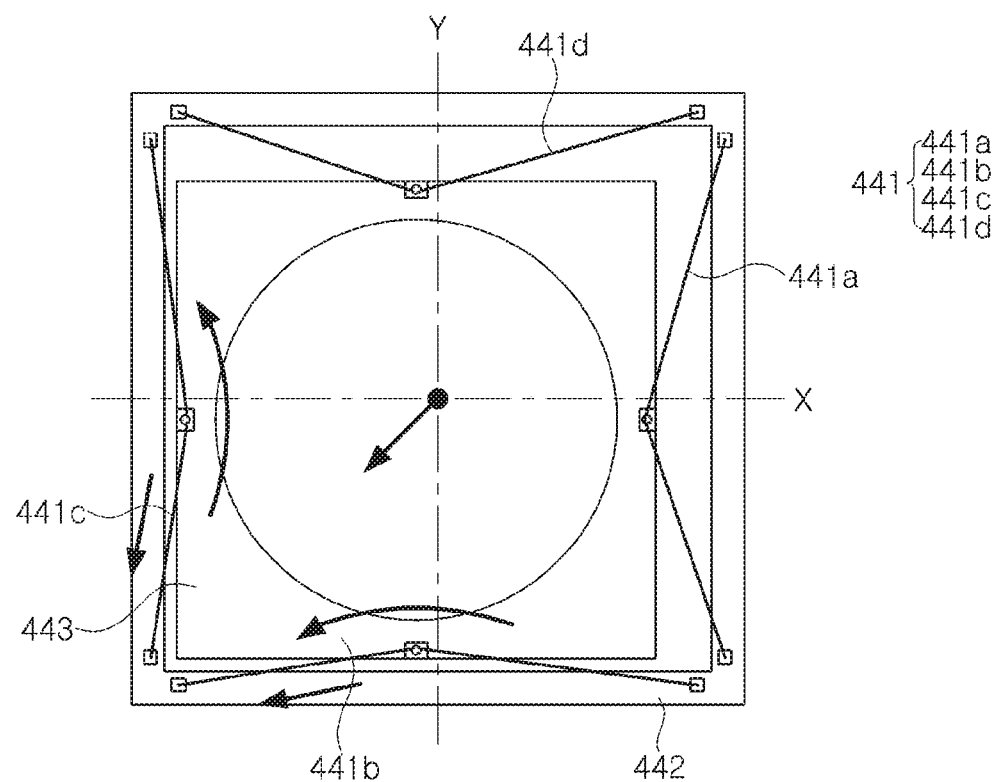

As illustrated in FIG. 35, when the second board 443 moves in a minus XY-axis direction, the second and third OIS driving wires 441b and 441c are contracted. In this case, the first and fourth OIS driving wires 441a and 441d are extended. Since the first to fourth OIS driving wires 441a, 441b, 441c, and 441d are connected to the second board 443 and supported by guiding members 443b of the second board 443, the second board 443 may move in the minus XY-axis direction while slidably moving with the extension and contraction of the first to fourth OIS driving wires 441a, 441b, 441c, and 441d.

Figure 36:
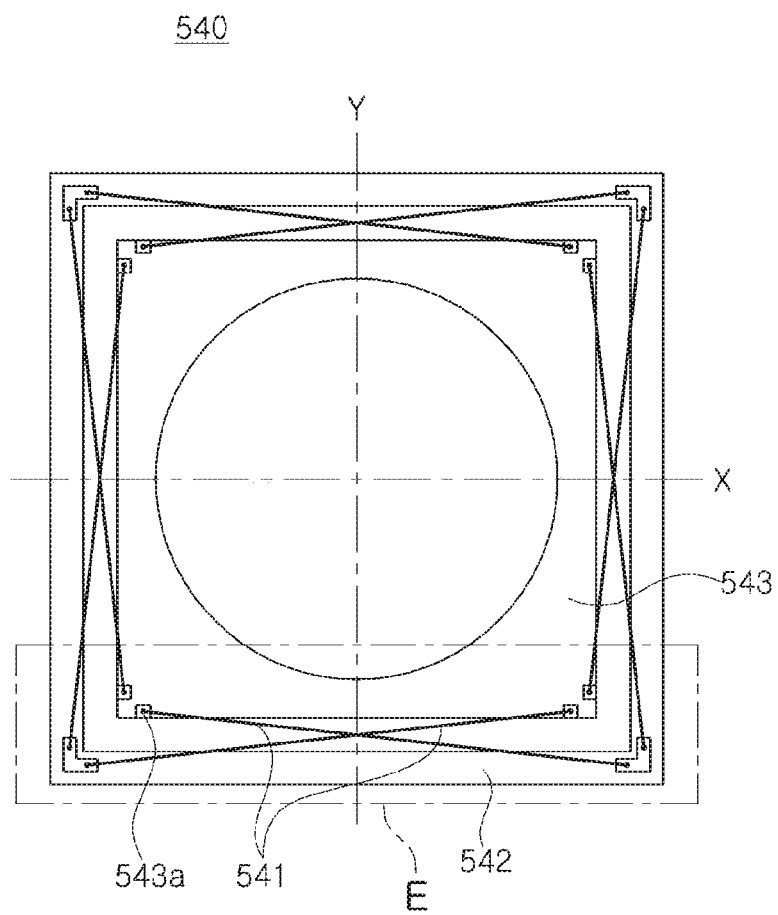
FIG. 36 is a plan view of an OIS driving member according to a third modified example.
Figure 37:
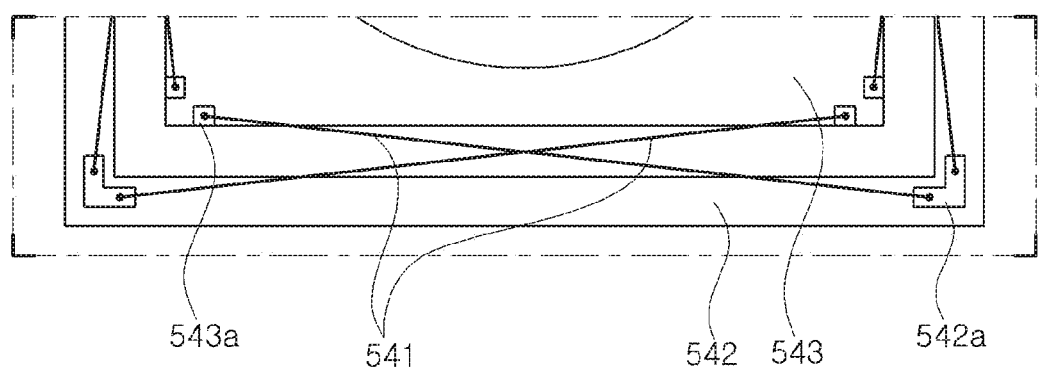
FIG. 37 is an enlarged view of portion E in FIG. 36.

FIG. 36 is a plan view of an OIS driving member according to a third modified example, and FIG. 37 is an enlarged view of portion E in FIG. 36.

Referring to FIGS. 36 and 37, an OIS driving member 540 includes an OIS driving wire 541 and first and second boards 542 and 543. The OIS driving wire 541 connects the first and second boards 542 and 543 to each other.

The first board 542 is provided with first bonding pads 542a at respective sides of a top surface of the first board 542. The OIS driving wire 541 has one end bonded to a first bonding pad 543b of the first board 542.

The second board 543 is provided with second bonding pads 543a at respective sides of a top surface of the second board 543. The OIS driving wire 541 has the other end bonded to a second bonding pad 543a of the second board 543.

A pair of OIS driving wires 541 are disposed on one side surface of the second board 543, and are arranged to be cross-coupled. For example, a total of eight OIS driving wires 541 may be disposed on the four side surfaces of the second board 543.

The OIS driving wires 541 may be formed of a material such as a nickel-titanium alloy, a copper-zinc alloy, a gold-cadmium alloy, an indium-thallium alloy, or the like.

FIGS. 38 to 43 are explanatory views illustrating a driving method of the OIS driving member 540 according to the third modified example.

Figure 38:
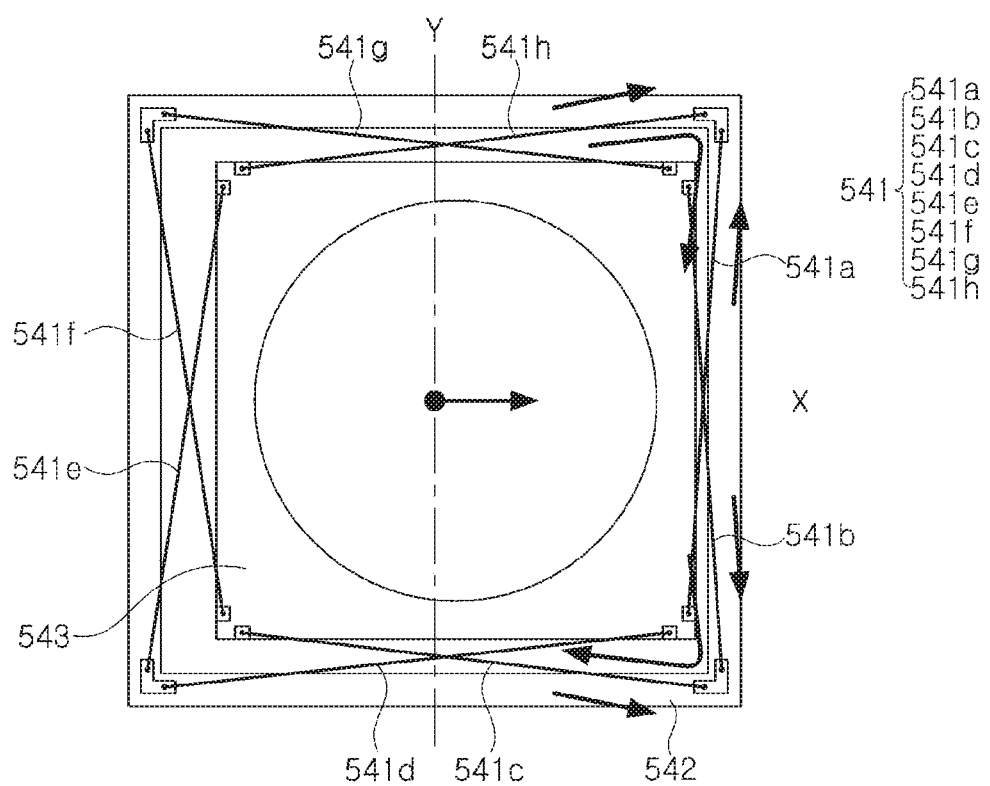
FIGS. 38, 39, 40, 41, 42, and 43 are explanatory views illustrating a driving method of the OIS driving member according to the third modified example.

As illustrated in FIG. 38, when the second board 543 moves in a plus X-axis direction, first, second, third, and eighth OIS driving wires 541a, 541b, 541c, and 541h of the OIS driving wire 541 are contracted. In this case, fourth, fifth, sixth, and seventh OIS driving wires 541d, 541e, 541f, and 541g are extended. Accordingly, the second board 543 may move in the plus X-axis direction.

Figure 39:
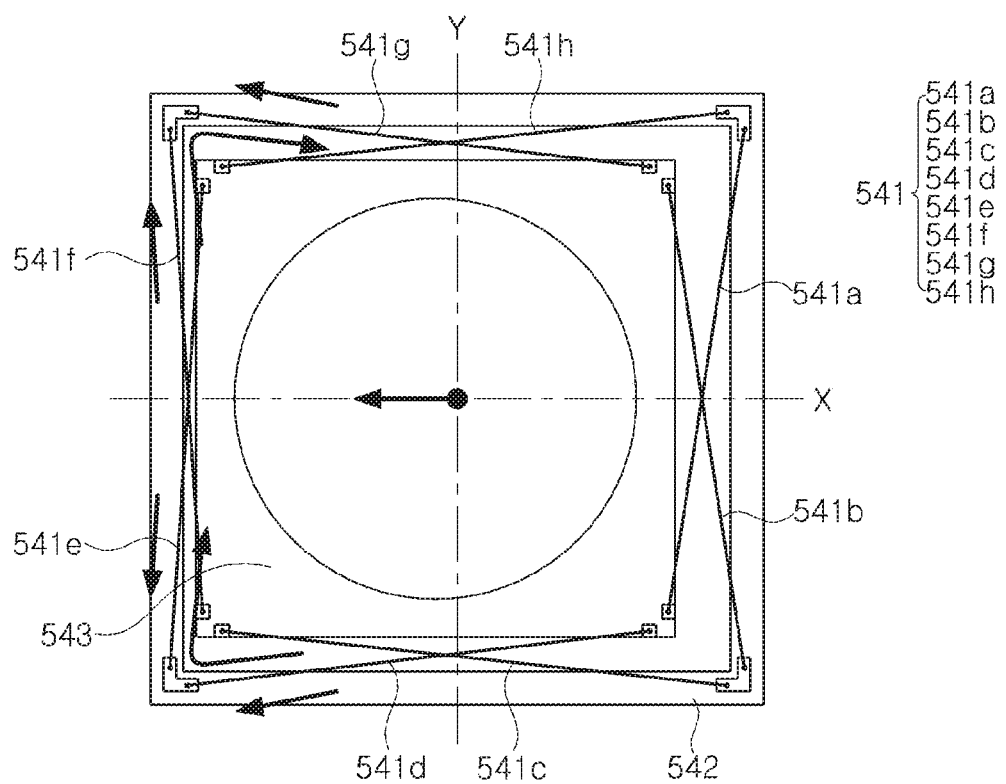

As illustrated in FIG. 39, when the second board 543 moves in a minus X-axis direction, the fourth, fifth, sixth, and seventh OIS driving wires 541d, 541e, 541f, and 541g of the OIS driving wire 541 are contracted. In this case, the first, second, third, and eight OIS driving wires 541a, 541b, 541c, and 541h of the OIS driving wire 541 are extended. Accordingly, the second board 543 may move in the minus X-axis direction.

Figure 40:
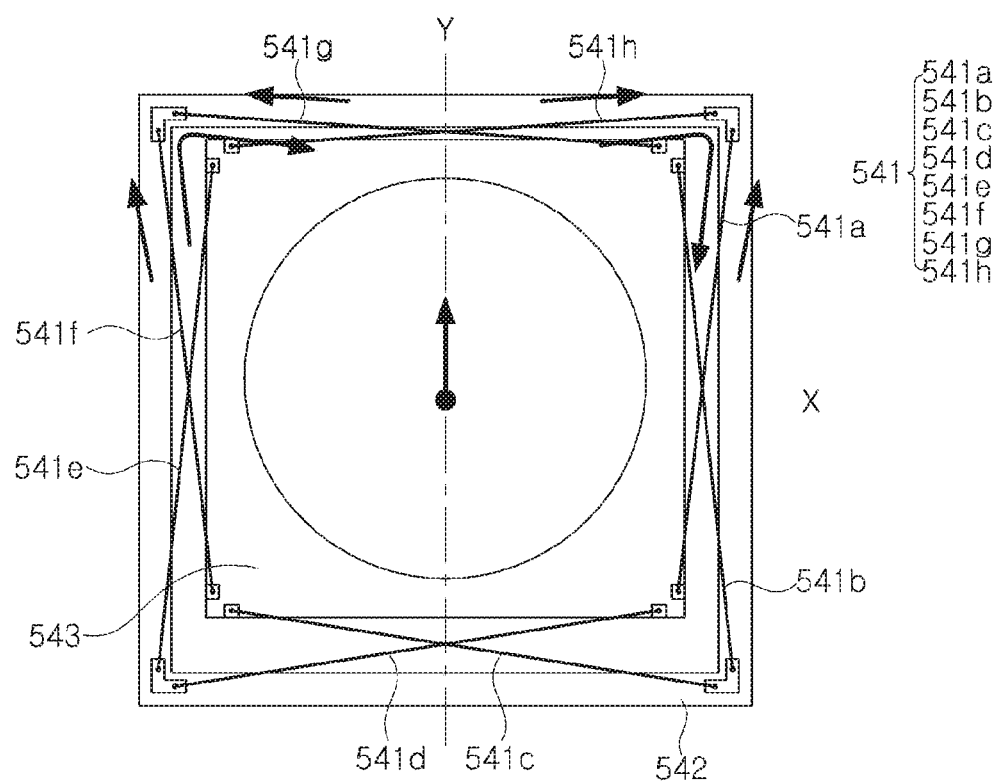

As illustrated in FIG. 40, when the second board 543 moves in a plus Y-axis direction, the first, sixth, seventh, and eight OIS driving wires 541a, 541f, 541g, and 541h are contracted. In this case, the second, third, fourth, and fifth OIS driving wires 541b, 541c, 541d, and 541e of the OIS driving wire 541 are extended. Accordingly, the second board 543 may move in the plus Y-axis direction.

Figure 41:
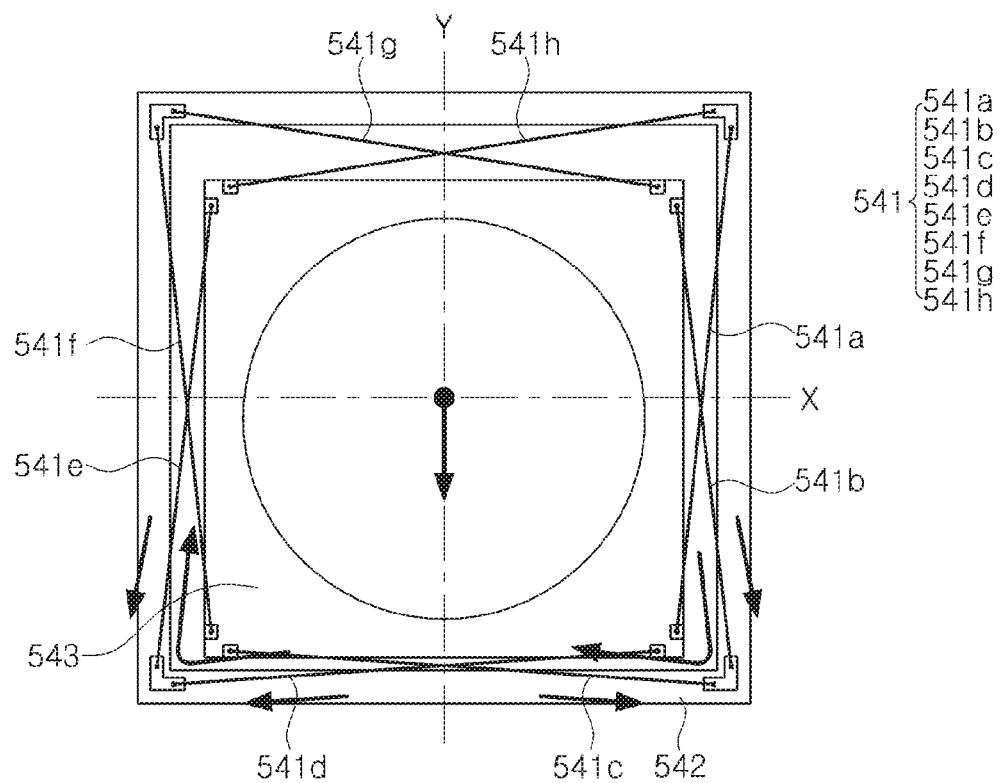

As illustrated in FIG. 41, when the second board 543 moves in a minus Y-axis direction, the second, third, fourth, and fifth OIS driving wires 541b, 541c, 541d, and 541e of the OIS driving wire 541 are contracted. In this case, the first, sixth, seventh, and eighth OIS driving wires 541a, 541f, 541g, and 541h of the OIS driving wire 541 are extended. Accordingly, the second board 543 may move in the minus Y-axis direction.

Figure 42:
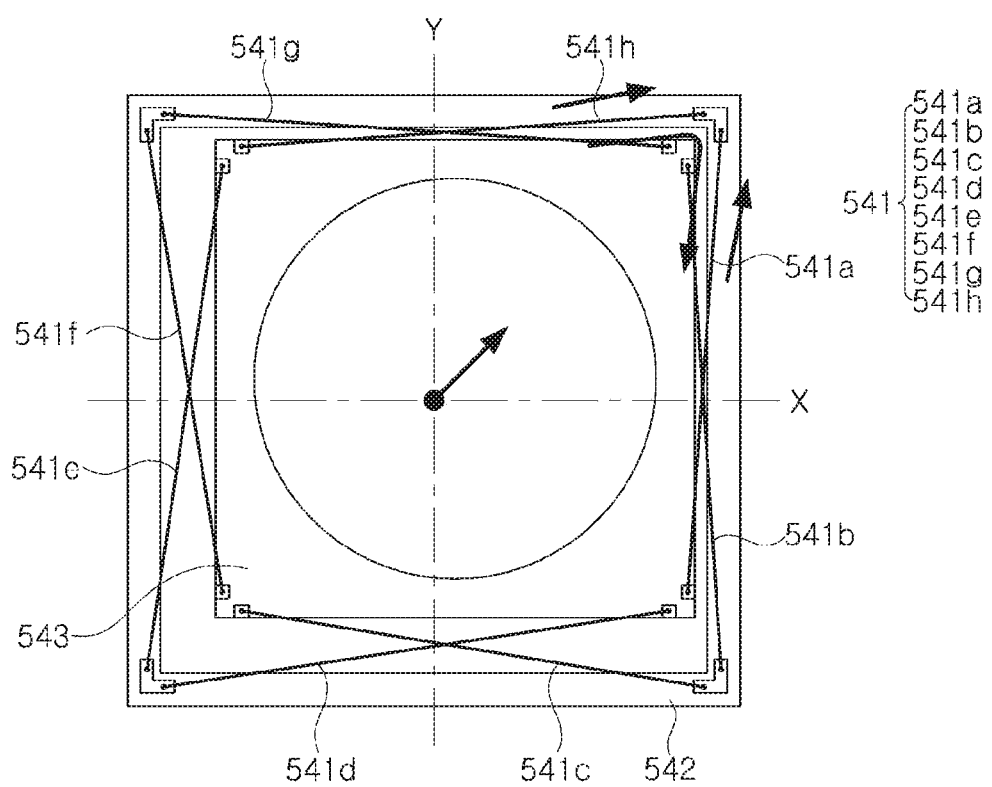

As illustrated in FIG. 42, when the second board 543 moves in a plus XY-axis direction, the first and eighth OIS driving wires 541a and 541h are contracted. In this case, the second and seventh OIS driving wires 541b and 541g are extended. The third, fourth, fifth, and seventh OIS driving wires 541c, 541d, 541e, and 541f may be appropriately contracted or extended according to the amount by which the second board 543 is moved. Accordingly, the second board 543 may move in the plus XY-axis direction.

Figure 43:
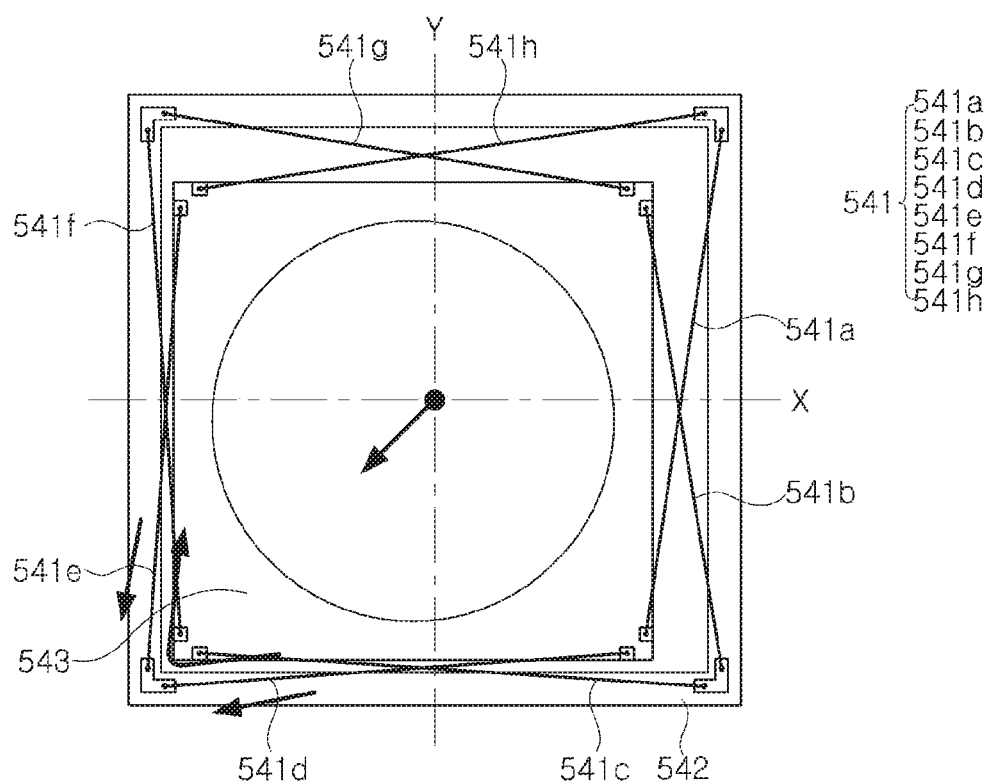

As illustrated in FIG. 43, when the second board 543 moves in a minus XY-axis direction, the fourth and fifth OIS driving wires 541d and 541e are contracted. In this case, the third and sixth OIS driving wires 541c and 541f are extended. The first, second, seventh, and eighth OIS driving wires 541a, 541b, 541g, and 541h may be appropriately contracted or extended according to the amount by which the second board 543 is moved. Accordingly, the second board 543 may move in the minus XY-axis direction.

As described above, a manufacturing process may be simplified, and deformation of a driving member may be prevented.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects of the present disclosure in each example are to be considered as being applicable to similar features or aspects of the present disclosure in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
a housing comprising an internal space;
a first moving body movably disposed in the internal space of the housing and comprising an internal space;
a second moving body movably disposed in the internal space of the first moving body;
an optical image stabilization (OIS) driving member comprising OIS driving wires formed of a shape memory alloy, a first board to which at least one end of each OIS driving wire is connected, and a second board to which each OIS driving wire is connected, an outer perimeter of the second board being disposed within an outer perimeter of the first board when the first board and the second board are viewed in a direction of an optical axis of the camera module; and an autofocusing (AF) driving member comprising AF driving wires formed of a shape memory alloy, a frame portion to which at least one end of each AF driving wire is connected, and a mounting bar to which each AF driving wire is connected, the frame portion and the mounting bar being centered on the optical axis when the frame portion and the mounting bar are viewed in a direction perpendicular to the optical axis.

2. The camera module of claim 1, wherein the first board, the second board, the frame portion, and the mounting bar each comprise bonding pads,
one end of each OIS driving wire is bonded to a respective bonding pad of the first board by spark discharge and ultrasonic vibrations, and the other end of each OIS driving wire is bonded to a respective bonding pad of the second board by spark discharge and ultrasonic vibrations, and
one end of each AF driving wire is bonded to a respective bonding pad of the frame portion by spark discharge and ultrasonic vibrations, and the other end of each AF driving wire is bonded to a respective bonding pad of the mounting bar by spark discharge and ultrasonic vibrations.

3. The camera module of claim 2, further comprising reinforcing members disposed to cover each end of each OIS driving wire, each end of each AF driving wire, and each bonding pad.

4. The camera module of claim 3, wherein the reinforcing members comprise a synthetic resin material cured by heat or ultraviolet rays.

5. The camera module of claim 1, wherein the first board and the second board were separated after being integrally manufactured, and
the first board is attached to the housing and the second board is attached to the first moving body, or the first board is attached to the first moving body and the second board is attached to the second moving body.

6. The camera module of claim 5, wherein the OIS driving wires comprise two OIS driving wires for each side of the first board,
one end of one of the two OIS driving wires is bonded to the first board at a first point adjacent to a respective side of the first board near one end of the respective side of the first board, and the other end of the one of the two OIS driving wires is bonded to the second board at a first point adjacent to a respective side of the second board and adjacent to a central axis of the respective side of the second board, and
one end of the other one of the two OIS driving wires is bonded to the first board at a second point adjacent to the respective side of the first board near the other end of the respective side of the first board, and the other end of the other one of the two OIS driving wires is bonded to the second board at a second point adjacent to the respective side of the second board and adjacent to the central axis of the respective side of the second board.

7. The camera module of claim 1, wherein the first board comprises two first mounting holes formed adjacent to each side of the first board near opposite ends of each side of the first board, and
the second board comprises two second mounting holes formed adjacent to each side of the second board and adjacent to a central axis of each side of the second board.

8. The camera module of claim 7, wherein the OIS driving wires comprise one OIS driving wire for each side of the first board,
one end of each OIS driving wire passes through one of the two first mounting holes formed adjacent to a respective side of the first board and is fixed to the first board by a knot,
a middle portion of the OIS driving wire passes through the two second mounting holes formed adjacent to a respective side of the second board and adjacent to the central axis of the respective side of the second board, and
the other end of the OIS driving wire passes through the other one of the two first mounting holes formed adjacent to the respective side of the first board and is fixed to the first board by a knot.

9. The camera module of claim 1, wherein the frame portion is mounted on the housing and the mounting bar is mounted on the first moving body, or
the mounting bar is mounted on the housing and the frame portion is mounted on the first moving body, or
the frame portion is mounted on the first moving body and the mounting bar is mounted on the second moving body, or
the mounting bar is mounted on the first moving body and the frame portion is mounted on the second moving body.

10. The camera module of claim 9, wherein the AF driving wires comprise two AF driving wires connected to an upper portion of the frame portion, and two AF driving wires connected to a lower portion of the frame portion.

11. The camera module of claim 10, wherein one end of each of the AF driving wires is bonded to the frame portion at a point near a respective corner of the frame portion, and the other end of each of the AF driving wires is bonded to the mounting bar.

12. The camera module of claim 1, wherein the second board comprises a guiding member disposed adjacent to each side of the second board and contacted by a respective OIS driving wire.

13. The camera module of claim 12, wherein the guiding member is disposed in a mounting hole formed in the second board adjacent to a respective side of the second board,
both ends of the respective OIS driving wire are bonded to the first board at respective points adjacent to a respective side of the first board near opposite ends of the respective side of the first board, and
a middle portion of the respective OIS driving wire is supported by the guiding member.

14. The camera module of claim 12, wherein the guiding member comprises a head portion configured to prevent the respective OIS driving wire from separating from the guiding member.

15. The camera module of claim 1, wherein one end of each OIS driving wire is bonded to the first board, and the other end of each OIS driving wire is bonded to the second board.

16. The camera module of claim 15, wherein the OIS driving wires comprise two OIS driving wires for each side of the first board,
one end of one of the two OIS driving wires is bonded to the first board at a first point adjacent to a respective side of the first board near one end of the respective side of the first board, and the other end of the one of the two OIS driving wires is bonded to the second board at a first point adjacent to a respective side of the second board near one end of the respective side of the second board closest to the other end of the respective side of the first board, and one end of the other one of the two OIS driving wires is bonded to the first board at a second point adjacent to the respective side of the first board near the other end of the respective side of the first board, and the other end of the other one of the two OIS driving wires is bonded to the second board at a second point adjacent to the respective side of the second board near the other end of the respective side of the second board closest to the one end of the respective side of the first board so that the two OIS driving wires cross each other.

17. A camera module comprising:

a housing comprising an internal space;

a first moving body movably disposed in the internal space of the housing and comprising an internal space;

a second moving body movably disposed in the internal space of the first moving body;

an optical image stabilization (OIS) driving member comprising OIS driving wires formed of a shape memory alloy; and an autofocusing (AF) driving member comprising AF driving wires formed of a shape memory alloy, wherein each OIS driving wire connects the housing and the first moving body to each other and each AF driving wire connects the first moving body and the second moving body to each other, or each AF driving wire connects the housing and the first moving body to each other and each OIS driving wire connects the first moving body and the second moving body to each other, the OIS driving member further comprises bonding pads disposed on the housing and the first moving body and the AF driving member further comprises bonding pads disposed on the first moving body and the second moving body, or the AF driving member further comprises bonding pads disposed on the housing and the first moving body and the OIS driving member further comprises bonding pads disposed on the first moving body and the second moving body, and both ends of each OIS driving wire are bonded to respective bonding pads of the OIS driving member by spark discharge and ultrasonic vibrations, and both ends of each AF driving wire are bonded to respective bonding pads of the AF driving member by spark discharge and ultrasonic vibrations.

18. The camera module of claim 17, further comprising reinforcing members disposed to cover each end of each OIS driving wire, each end of each AF driving wire, and each bonding pad.

19. The camera module of claim 18, wherein the reinforcing members comprise a synthetic resin cured by heat or ultraviolet rays.

20. A camera module comprising:

a housing;

a moving body disposed inside the housing and comprising lenses; and a driving member disposed inside the housing, the driving member comprising a first board, a second board attached to the moving body, an outer perimeter of the second board being disposed within an outer perimeter of the first board when the first board and the second board are viewed in a direction of an optical axis of the camera module, and optical image stabilization (OIS) driving wires connected between the first board and the second board and configured to drive the second board in one or more directions perpendicular to the optical axis, thereby driving the moving body to which the second board is attached in the one or more directions perpendicular to the optical axis, wherein the OIS driving wires are not perpendicular to the optical axis and are not parallel to the optical axis.

21. The camera module of claim 1, wherein the first board and the second board are disposed substantially perpendicular to the optical axis, the second board is spaced apart from the first board in the direction of the optical axis, the frame portion and the mounting bar are disposed substantially parallel to the optical axis, the mounting bar is spaced apart from the frame portion in the direction perpendicular to the optical axis, and a longest dimension of the mounting bar is parallel to the optical axis.

22. The camera module of claim 20, wherein the OIS driving wires suspend the second board and the moving body to which the moving body is attached above the first board.

* * * * *